United States Patent
Ko et al.

(10) Patent No.: US 11,330,629 B2
(45) Date of Patent: *May 10, 2022

(54) HIGH DENSITY ENVIRONMENT INCLUDING OVERLAPPED BASIC SERVICE SET

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Jinsam Kwak, Gyeonggi-do (KR); Woojin Ahn, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 16/942,765

(22) Filed: Jul. 30, 2020

(65) Prior Publication Data
US 2020/0359417 A1  Nov. 12, 2020

Related U.S. Application Data

(63) Continuation of application No. 15/968,681, filed on May 1, 2018, now Pat. No. 10,764,924, which is a
(Continued)

(30) Foreign Application Priority Data

Nov. 3, 2015 (KR) .................. 10-2015-0154100
Nov. 9, 2015 (KR) .................. 10-2015-0156467
(Continued)

(51) Int. Cl.
*H04W 74/08* (2009.01)
*H04W 84/12* (2009.01)
(Continued)

(52) U.S. Cl.
CPC ...... *H04W 74/0808* (2013.01); *H04B 17/318* (2015.01); *H04W 52/243* (2013.01);
(Continued)

(58) Field of Classification Search
CPC .......... H04W 74/0808; H04W 52/243; H04W 52/245; H04W 84/12; H04B 17/318; Y02D 70/142; Y02D 70/00
See application file for complete search history.

(56) References Cited

U.S. PATENT DOCUMENTS 8,483,741 B1   7/2013  Hussain et al.
10,128,966 B1  11/2018 Chu et al.
(Continued)

FOREIGN PATENT DOCUMENTS

CN  101374321  2/2009
CN  101616408  12/2009
(Continued)

OTHER PUBLICATIONS

WO 2017/012182 A1 (Year: 2015).*
(Continued)

*Primary Examiner* — Ian N Moore
*Assistant Examiner* — Rushil Parimal Sampat
(74) *Attorney, Agent, or Firm* — Ladas & Parry, LLP

(57) ABSTRACT

Provided is a wireless communication terminal that communicates wirelessly. The wireless communication terminal includes: a transceiver; and a processor. The processor receives a first PLCP Protocol Data Unit (PPPU) through the
(Continued)

transceiver, and transmits a second PPDU based on Basic Service Set (BSS) information indicated by the first PPDU.

14 Claims, 17 Drawing Sheets

Related U.S. Application Data continuation of application No. PCT/KR2016/012615, filed on Nov. 3, 2016.

(30) Foreign Application Priority Data

| | | |
|---|---|---|
| May 20, 2016 | (KR) | 10-2016-0062425 |
| Jun. 14, 2016 | (KR) | 10-2016-0074091 |
| Jul. 7, 2016 | (KR) | 10-2016-0086044 |

(51) Int. Cl.
*H04W 52/24* (2009.01)
*H04B 17/318* (2015.01)

(52) U.S. Cl.
CPC ......... *H04W 52/245* (2013.01); *H04W 84/12* (2013.01); *Y02D 30/70* (2020.08)

(56) References Cited

U.S. PATENT DOCUMENTS

| | | |
|---|---|---|
| 10,524,290 B1 | 12/2019 | Chu et al. |
| 10,542,526 B2 | 1/2020 | Seok |
| 10,785,795 B2 | 9/2020 | Son et al. |
| 10,863,502 B1 | 12/2020 | Chu et al. |
| 2012/0155350 A1 | 6/2012 | Wentink et al. |
| 2012/0157151 A1 | 6/2012 | Chu et al. |
| 2014/0307726 A1 | 10/2014 | Kang et al. |
| 2015/0078299 A1 | 3/2015 | Barriac et al. |
| 2015/0103767 A1 | 4/2015 | Kim et al. |
| 2015/0110093 A1 | 4/2015 | Asterjadhi et al. |
| 2015/0264617 A1 | 9/2015 | Choudhury et al. |
| 2015/0282043 A1 | 10/2015 | Fang et al. |
| 2016/0050691 A1 | 2/2016 | Jauh et al. |
| 2016/0088126 A1 | 3/2016 | Doan et al. |
| 2016/0249366 A1 | 8/2016 | Seok |
| 2016/0330788 A1 | 11/2016 | Zheng et al. |
| 2016/0353275 A1 | 12/2016 | Liu et al. |
| 2016/0374087 A1 | 12/2016 | Liu et al. |
| 2017/0006541 A1 | 1/2017 | Huang et al. |
| 2017/0006661 A1 | 1/2017 | Huang et al. |
| 2017/0041798 A1 | 2/2017 | Li et al. |
| 2017/0094685 A1 | 3/2017 | Noh et al. |
| 2017/0105143 A1 | 4/2017 | Seok |
| 2017/0188376 A1 | 6/2017 | Noh et al. |
| 2017/0201981 A1 | 7/2017 | Huang et al. |
| 2017/0230981 A1 | 8/2017 | Ryu et al. |
| 2017/0251432 A1 | 8/2017 | Park et al. |
| 2017/0289987 A1 | 10/2017 | Seok |
| 2017/0294949 A1 | 10/2017 | Zhang et al. |
| 2018/0146469 A1* | 5/2018 | Luo .............. H04W 72/0446 |
| 2018/0213565 A1 | 7/2018 | Huang et al. |
| 2018/0220456 A1 | 8/2018 | Kim et al. |
| 2018/0227952 A1 | 8/2018 | Kim et al. |
| 2018/0249501 A1 | 8/2018 | Ko et al. |
| 2018/0295567 A1 | 10/2018 | Ko et al. |
| 2018/0317166 A1 | 11/2018 | Huang et al. |
| 2018/0317170 A1 | 11/2018 | Cariou |
| 2018/0317173 A1 | 11/2018 | Kim et al. |
| 2018/0359807 A1 | 12/2018 | Kim et al. |
| 2019/0028898 A1 | 1/2019 | Ko et al. |
| 2019/0029038 A1 | 1/2019 | Kim et al. |
| 2019/0306824 A1* | 10/2019 | Chu .............. H04B 7/0452 |

FOREIGN PATENT DOCUMENTS

| | | |
|---|---|---|
| CN | 101647299 | 2/2010 |
| CN | 103081539 | 5/2013 |
| CN | 104321998 | 1/2015 |
| CN | 104853375 | 8/2015 |
| CN | 104641683 | 7/2018 |
| JP | 2004-525586 | 8/2004 |
| JP | 2014-17866 | 1/2014 |
| JP | 2015-167417 | 9/2015 |
| KR | 10-2013-0005289 | 1/2013 |
| KR | 10-2013-0028972 | 3/2013 |
| KR | 10-2014-0035841 | 3/2014 |
| KR | 10-2014-0036295 | 3/2014 |
| KR | 10-2014-0070528 | 6/2014 |
| KR | 10-2014-0097160 | 8/2014 |
| KR | 10-2014-0130113 | 11/2014 |
| KR | 10-2015-0020106 | 2/2015 |
| KR | 10-2015-0073855 | 7/2015 |
| KR | 10-2015-0123683 | 11/2015 |
| KR | 10-2016-0006235 | 1/2016 |
| KR | 10-2016-0019867 | 2/2016 |
| KR | 10-2016-0031542 | 3/2016 |
| KR | 10-2016-0034853 | 3/2016 |
| KR | 10-2019-0105666 | 9/2019 |
| KR | 10-2019-0112193 | 10/2019 |
| KR | 10-2020-0033915 | 3/2020 |
| KR | 10-2021-0110403 | 9/2021 |
| KR | 10-2021-0158886 | 12/2021 |
| WO | 2011/115408 | 9/2011 |
| WO | 2012/077859 | 6/2012 |
| WO | 2013/130793 | 9/2013 |
| WO | 2015/060514 | 4/2015 |
| WO | 2015/061472 | 4/2015 |
| WO | 2015/064943 | 5/2015 |
| WO | 2015/081169 | 6/2015 |
| WO | 2015/112780 | 7/2015 |
| WO | 2015/120488 | 8/2015 |
| WO | 2015/156616 | 10/2015 |
| WO | 2015/171790 | 11/2015 |
| WO | 2015/198157 | 12/2015 |
| WO | 2016/029876 | 3/2016 |
| WO | 2016/036138 | 3/2016 |
| WO | 2016/040837 | 3/2016 |
| WO | 2016/044652 | 3/2016 |
| WO | 2016/087917 | 6/2016 |
| WO | 2017/078442 | 5/2017 |
| WO | 2017/171531 | 10/2017 |

OTHER PUBLICATIONS

Office Action dated Sep. 29, 2021 for U.S. Appl. No. 16/945,937.
Office Action dated Oct. 18, 2021 for U.S. Appl. No. 17/113,026.
Office Action dated Oct. 18, 2021 for U.S. Appl. No. 17/113,029.
Office Action dated Sep. 16, 2021 for Chinese Patent Application No. 201780022351.4 and its English translation provided by Applicant's foreign counsel.
Jun Luo et al.: "Discussion on Spatial Reuse Operations in 11ax", IEEE 802.11-16/0382r0, Huawei Technologies, Mar. 11, 2016, slides 1-18.
Office Action dated Jul. 28, 2020 for Japanese Patent Application No. 2019-142262 and its English translation provided by Applicant's foreign counsel.
Notice of Allowance dated Jul. 24, 2020 for Korean Patent Application No. 10-2018-7010293 and its English translation provided by Applicant's foreign counsel.
Notice of Allowance dated Aug. 19, 2020 for U.S. Appl. No. 16/219,937.
Office Action dated Oct. 12, 2020 for Chinese Patent Application No. 201680061366.7 and its English translation provided by Applicant's foreign counsel.
Office Action dated Nov. 25, 2020 for Indian Patent Application No. 201827035700.
Office Action dated Mar. 16, 2021 for Korean Patent Application No. 10-2018-7036233 and its English translation provided by Applicant's foreign counsel.

(56) References Cited

OTHER PUBLICATIONS

Rossi Jun Luo et al.: "OBSS NAV and PD Threshold Rule for Spatial Reuse", doc.: IEEE 802.11-15/1109r1, Huawei, Sep. 13, 2015, Slides 1-20.
Office Action dated Aug. 30, 2021 for Korean Patent Application No. 10-2018-7012484 and its English translation provided by Applicant's foreign counsel.
Office Action dated Dec. 17, 2021 for U.S. Appl. No. 16/945,934.
Office Action dated Apr. 23, 2021 for Chinese Patent Application No. 201680061366.7 and its English translation provided by Applicant's foreign counsel.
Notice of Allowance dated May 12, 2021 for U.S. Appl. No. 16/813,660.
Notice of Allowance dated Jun. 7, 2021 for U.S. Appl. No. 16/813,660.
Office Action dated May 20, 2021 for Korean Patent Application No. 10-2021-7010350 and its English translation provided by Applicant's foreign counsel.
Office Action dated Jan. 25, 2021 for Chinese Patent Application No. 201680063960.X and its English translation provided by Applicant's foreign counsel.
Notice of Allowance dated Apr. 8, 2021 for U.S. Appl. No. 16/812,375.
Notice of Allowance dated Jun. 3, 2021 for U.S. Appl. No. 16/812,375
International Search Report for PCT/KR2016/012615 dated Feb. 28, 2017 and its English translation from WIPO (published as WO 2017/078442).
Written Opinion of the International Searching Authority for PCT/KR2016/012615 dated Feb. 28, 2017 and its English machine translation by Google Translate (published as WO 2017/078442).
International Preliminary Report on Patentability (Chapter I) for PCT/KR2016/012615 dated May 8, 2018 and its English translation from WIPO.
Office Action dated Mar. 19, 2019 for Japanese Application No. 2018-520532 and its English translation provided by Applicant's foreign council.
Extended European Search Report dated Apr. 23, 2019 for European Application No. 16857801.1.
Matthew Fischer et al.: "CID 205 BSSID Color Bits". Sep. 18, 2013, XP055421527, IEEE-SA mentor, Piscataway, NJ USA, Retrieved from the Internet: URL:https://mentor.ieee.org/802.11/dcn/13/11-13-1207-01-00ah-partial-aid-color-bits.pptx [retrieved on Nov. 3, 2017].
John Son (Wilus Institute): "Further Considerations on Enhanced CCA for 11ax; 11-14-0847-01-00ax-further-considerations-on-enhanced-cca-for-11ax", IEEE Draft; 11-14-0847-01-00AX-Further-Considerations-On-Enhanced-CCA-For-11AX, IEEE-SA Mentor. Piscataway, NJ USA, vol. 802.11 ax, No. 1, Jul. 15, 2014, pp. 1+12, XP068069563 [retrieved on Jul. 15, 2014].
Robert Stacey (Intel): "Spec Framework; 11-15-0132-09-00ax-spec-framework", IEEE Draft; 11-15-0132-09-OOAX-Spec-Framework, IEEE-SA Mentor, Piscataway, NJ USA, vol. 802.11ax, No. 9, Sep. 22, 2015, pp. 1-22, XP068097995, [retrieved on Sep. 22, 2015].
Alfred Asterjadhi: Identifiers in HE PPDUs for power saving, IEEE Draft; 11-15-1122-00-00AX-Identifiers-In-HE-PPDUS-For-Power-Saving, IEEE-SA Mentor, Piscataway, NJ USA, vol. 802.11ax Sep. 12, 2015, pp. 1-18, XP068098373, Retrieved from the Internet: URL:https://mentor.ieee.org/802.11/dcn/15/11-15-1122-00-00ax-identifiers-in-he-ppdus-for-power-saving.pptx.
Notice of Allowance dated Dec. 11, 2019 for U.S. Appl. No. 16/141,973.
Office Action dated Sep. 25, 2019 for U.S. Appl. No. 15/953,404.
Notice of Allowance dated Apr. 29, 2020 for U.S. Appl. No. 15/953,404.
Final Office Action dated May 4, 2020 for U.S. Appl. No. 16/219,937.
Office Action dated May 27, 2020 for Indian Patent Application No. 201827014271.
Office Action dated May 6, 2020 for European Patent Application No. 16857801.1.
Notice of Allowance dated Jul. 3, 2020 for Korean Patent Application No. 10-2020-7018343 and its English translation provided by Applicant's foreign counsel.
Office Action dated Jul. 3, 2020 for Korean Patent Application No. 10-2020-7018342 and its English translation provided by Applicant's foreign counsel.
Non-Final Office Action dated Jun. 28, 2019 for U.S. Appl. No. 15/968,681 (now published as US 2018/0249501).
Final Office Action dated Nov. 26, 2019 for U.S. Appl. No. 15/968,681 (now published as US 2018/0249501).
Notice of Allowance dated Apr. 23, 2020 for U.S. Appl. No. 15/968,681 (now published as US 2018/0249501)
Final Office Action dated Jan. 15, 2020 for U.S. Appl. No. 15/953,404.
Non-Final Office Action dated Jan. 22, 2020 for U.S. Appl. No. 16/219,937.
Office Action dated Mar. 25, 2020 for Korean Patent Application No. 10-2018-7010293 and its English translation provided by Applicant's foreign counsel.
Notice of Allowance dated Mar. 20, 2020 for Korean Patent Application No. 10-2018-7027609 and its English translation provided by Applicant's foreign counsel.
Notice of Allowance dated Mar. 23, 2020 for Korean Patent Application No. 10-2018-7027723 and its English translation provided by Applicant's foreign counsel.
Office Action dated Jan. 25, 2022 for Japanese Patent Application No. 2020-200512 and its English translation provided by Applicant's foreign counsel.
Notice of Allowance dated Jan. 28, 2022 for Korean Patent Application No. 10-2021-7042355 and its English translation provided by Applicant's foreign counsel.
Notice of Allowance dated Feb. 8, 2022 for U.S. Appl. No. 16/942,764.
Office Action dated Mar. 25, 2022 for Korean Patent Application No. 10-2021-7010350 and its English translation provided by Applicant's foreign counsel.
Final Office Action dated Feb. 22, 2022 for U.S. Appl. No. 17/113,026.
Final Office Action dated Feb. 22, 2022 for U.S. Appl. No. 17/113,029.
Notice of Allowance dated Feb. 25, 2022 for U.S. Appl. No. 16/945,937.
Office Action dated Mar. 11, 2022 for Korean Patent Application No. 10-2022-7006593 and its English translation provided by Applicant's foreign counsel.
Office Action dated Mar. 11, 2022 for Korean Patent Application No. 10-2022-7006595 and its English translation provided by Applicant's foreign counsel.

\* cited by examiner

| HE PHY | MPDU | Trigger frame |
|---|---|---|
| | Trigger frame | |

←———————————————————→
Spatial reuse transmission is limited to within the
duration of HE MU PPDU with UL flag set to 0.

HIGH DENSITY ENVIRONMENT INCLUDING OVERLAPPED BASIC SERVICE SET

CROSS-REFERENCE TO RELATED APPLICATIONS

This application is a continuation of U.S. patent application Ser. No. 15/968,681 filed on May 1, 2018, now issued as U.S. Pat. No. 10,764,924 B2 which is a continuation of International Patent Application No. PCT/KR2016/012615 filed on Nov. 3, 2016, which claims the priority to Korean Patent Application No. 10-2015-0154100 filed in the Korean Intellectual Property Office on Nov. 3, 2015, Korean Patent Application No. 10-2015-0156467 filed in the Korean Intellectual Property Office on Nov. 9, 2015, Korean Patent Application No. 10-2016-0062425 filed in the Korean Intellectual Property Office on May 20, 2016, Korean Patent Application No. 10-2016-0074091 filed in the Korean Intellectual Property Office on Jun. 14, 2016 and Korean Patent Application No. 10-2016-0086044 filed in the Korean Intellectual Property Office on Jul. 7, 2016, the entire contents of which are incorporated herein by reference.

TECHNICAL FIELD

The present invention relates to a wireless communication method and a wireless communication terminal in a high-density environment including an overlapped basic service set.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of the present invention is to provide a wireless communication method and a wireless communication terminal in a high-density environment including an overlapped basic service set.

Technical Solution

According to an embodiment of the present invention, a wireless communication terminal that communicates wirelessly includes: a transceiver; and a processor, wherein the processor is configured to receive a first PLCP Protocol Data Unit (PPPU) through the transceiver, and transmit a second PPDU based on Basic Service Set (BSS) information indicated by the first PPDU.

When a BSS indicated by the first PPDU is different from a BSS including the wireless communication terminal and the first PPDU includes a trigger frame, the processor may be configured to measure an received signal strength of the first PPDU, and when the second PPDU is transmitted after transmission of the first PPDU is completed, the processor may be configured to adjust a transmission power of the second PPDU based on the received signal strength.

The processor may be configured to receive a third PPDU that is an uplink PPDU transmitted based on the trigger frame through the transceiver, and after decoding a signaling field of the third PPDU, the processor may be configured to transmit the second PPDU based on the signaling field of the third PPDU.

The wireless processor may be configured to decode the signaling field of the third PPDU to determine whether the third PPDU is transmitted based on the first PPDU, and adjust the transmission power of the second PPDU based on whether the third PPDU is transmitted based on the first PPDU.

The processor may be configured to determine whether the third PPDU is transmitted based on the first PPDU based on whether a BSS color indicated by the signaling field of the third PPDU is equal to a BSS color of the BSS including the wireless communication terminal.

The processor may be configured to set a value of a network allocation vector (NAV) according to the BSS indicated by the third PPDU.

The signaling field of the third PPDU may be configured to include a parameter determined based on a magnitude of interference acceptable by a wireless communication terminal transmitting the first PPDU when receiving the third PPDU and a transmission power of the first PPDU, wherein the processor may be configured to adjust the transmission power of the second PPDU based on a value of the parameter and the received signal strength.

The value of the parameter may be a value normalized over a 20 MHz frequency band width.

When the BSS indicated by the first PPDU is different from the BSS including the wireless communication terminal, the processor may be configured to perform CCA by applying an overlapped BSS (OBSS) CCA threshold value that is greater than a CCA threshold value applied to a PPDU transmitted from the BSS including the wireless communication terminal, and adjust a transmission power of the second PPDU in conjunction with the OBSS CCA threshold value.

When transmitting a fourth PPDU within a transmission opportunity (TXOP) obtained when transmitting the second PPDU, the processor may be configured to adjust a transmission power of the fourth PPDU in conjunction with the OBSS CCA threshold value.

The signaling field of the second PPDU may be configured to include a field indicating that the transmission power is adjusted.

According to an embodiment of the present invention, an operation method of a wireless communication terminal that communicates wirelessly includes: receiving a first PLCP Protocol Data Unit (PPPU) through the transmission/reception unit, and transmitting a second PPDU based on Basic Service Set (BSS) information indicated by the first PPDU.

The transmitting of the second PPDU may include: when a BSS indicated by the first PPDU is different from a BSS including the wireless communication terminal and the first PPDU includes a trigger frame, measuring an received signal strength of the first PPDU; and when the second PPDU is transmitted after transmission of the first PPDU is completed, adjusting a transmission power of the second PPDU based on the received signal strength.

The transmitting of the second PPDU may include: receiving a third PPDU that is an uplink PPDU transmitted based on the trigger frame through the transmission/reception unit, and after decoding a signaling field of the third PPDU, transmitting the second PPDU based on the signaling field of the third PPDU.

The transmitting of the second PPDU based on the signaling field of the third PPDU after the decoding of the signaling field of the third PPDU may include: decoding the signaling field of the third PPDU to determine whether the third PPDU is transmitted based on the first PPDU; and adjusting the transmission power of the second PPDU based on whether the third PPDU is transmitted based on the first PPDU.

The decoding of the signaling field of the third PPDU to determine whether the third PPDU is transmitted based on the first PPDU may include determining whether the third PPDU is transmitted based on the first PPDU based on whether a BSS color indicated by the signaling field of the third PPDU is equal to a BSS color of the BSS including the wireless communication terminal.

The transmitting of the second PPDU may further include setting a value of a network allocation vector (NAV) according to the BSS indicated by the third PPDU.

The signaling field of the third PPDU may include a parameter determined based on a magnitude of interference acceptable by a wireless communication terminal transmitting the first PPDU when receiving the third PPDU and a transmission power of the first PPDU, wherein the adjusting of the transmission power of the second PPDU may include adjusting the transmission power of the second PPDU based on a value of the parameter and the received signal strength.

The transmitting of the second PPDU may include: performing CCA by applying an overlapped BSS (OBSS) CCA threshold value that is greater than a CCA threshold value applied to a PPDU transmitted from the BSS including the wireless communication terminal, and adjusting a transmission power of the second PPDU in conjunction with the OBSS CCA threshold value.

The operating method may further include when transmitting a fourth PPDU within a transmission opportunity (TXOP) obtained when transmitting the second PPDU, adjusting a transmission power of the fourth PPDU in conjunction with the OBSS CCA threshold value.

Advantageous Effects

An embodiment of the present invention is to provide a wireless communication method and a wireless communication terminal in a dense environment including an overlapped basic service set.

MODE FOR CARRYING OUT THE INVENTION

Figure 1:
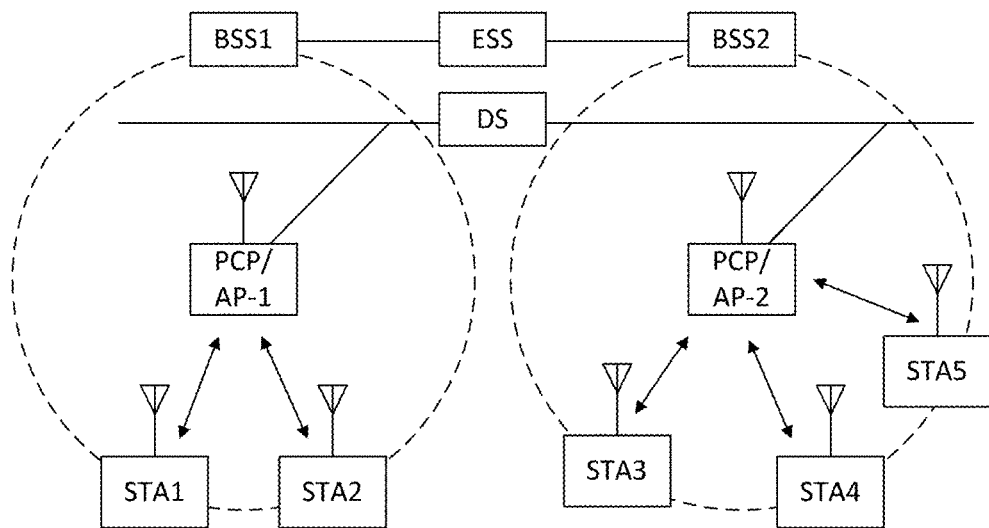
FIG. 1 shows a wireless LAN system according to an embodiment of the present invention.

Preferred embodiments of the present invention will be described below in more detail with reference to the accompanying drawings. The present invention may, however, be embodied in different forms and should not be construed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application No. 10-2015-0154100 (Nov. 3, 2015), No. 10-2015-0156467 (Nov. 9, 2015), No. 10-2016-0062425 (May 20, 2016), No. 10-2016-0074091 (Jun. 14, 2016), and Nos. 10-2016-0086044 (Jul. 7, 2016) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
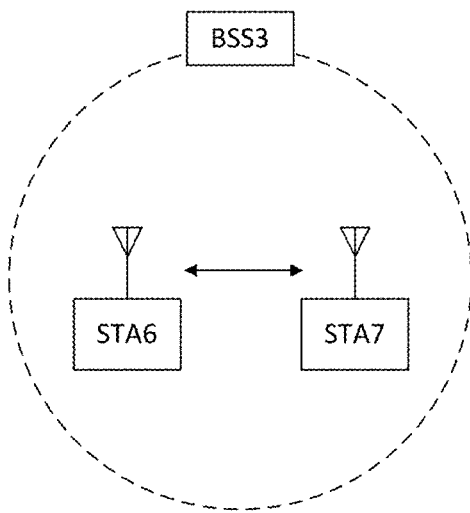
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
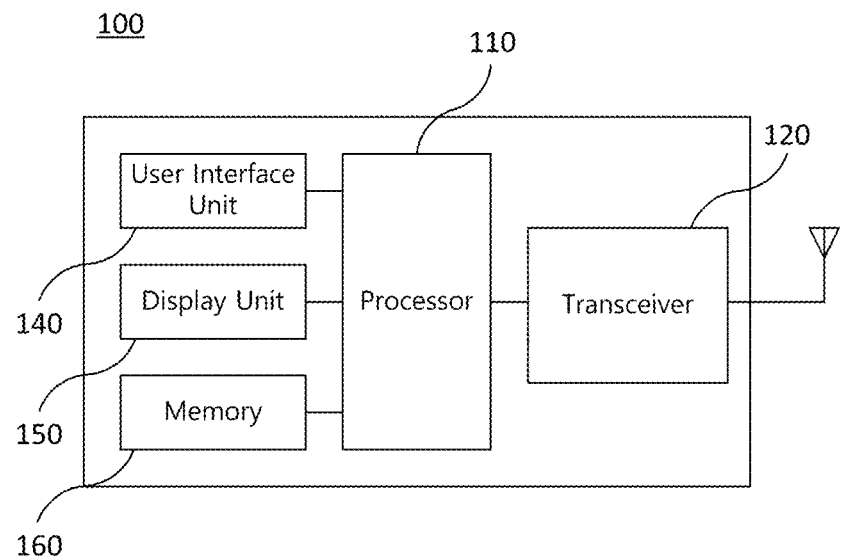
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
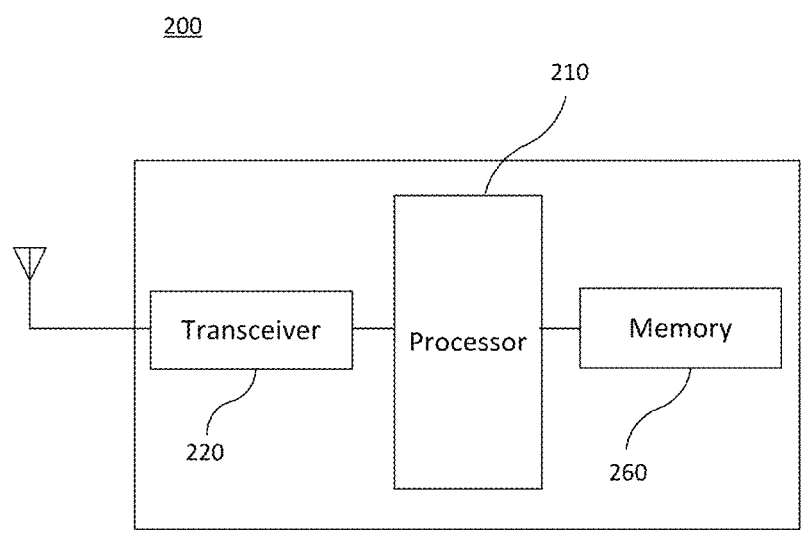
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
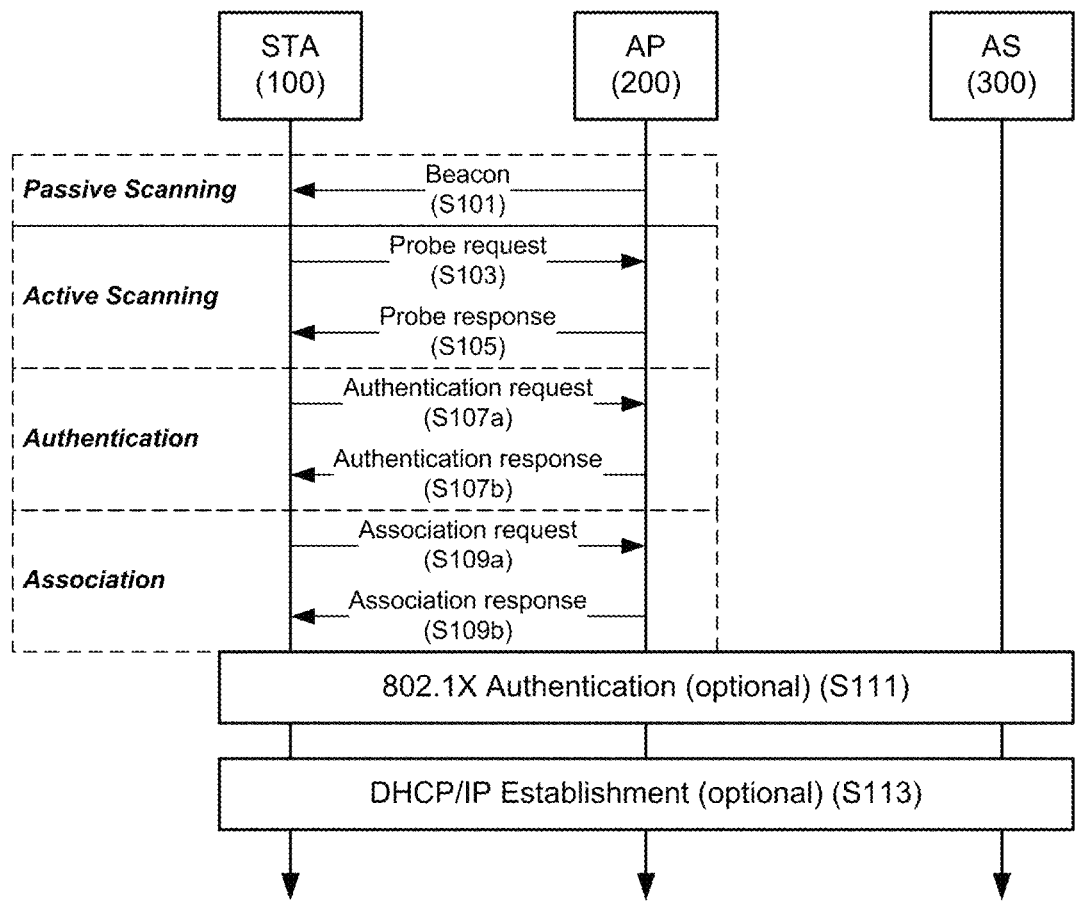
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Due to the spread of mobile devices and the supply of wireless communication, wireless communication terminals are increasingly communicating in a dense environment. Particularly, the number of cases where a wireless communication terminal communicates in an environment in which a plurality of BSSs are overlapped is increasing. When multiple BSSs are overlapped, the communication efficiency of the wireless communication terminal may be degraded due to interference with other wireless communication terminals. In particular, when a frequency band is used through a contention procedure, a wireless communication terminal may not obtain even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a frame transmitted from a BSS including a wireless communication terminal or a frame transmitted from another BSS. In a specific embodiment, the operation of accessing the channel may include a CCA operation and a deferral operation. For example, the wireless communication terminal may adjust a Clear Channel Assessment (CCA) threshold according to whether a frame received by the wireless communication terminal is a frame transmitted from a BSS including the wireless communication terminal or a frame transmitted from an OBSS. Also, the wireless communication terminal may adjust the transmission power of the PPDU to be transmitted in the SR operation. An embodiment for an SR operation of the wireless communication terminal will be described with reference to FIGS. 6 to 21.

For convenience of explanation, a BSS including a wireless communication terminal is referred to as Intra-BSS, and a basic service set overlapped with Intra-BSS is referred to as an Overlapped Basic Service Set (OBSS). In addition, a frame transmitted in the Intra-BSS is referred to as an Intra-BSS frame, and a frame transmitted in the OBSS is referred to as an OBSS frame or an Inter-BSS frame.

Figure 6:
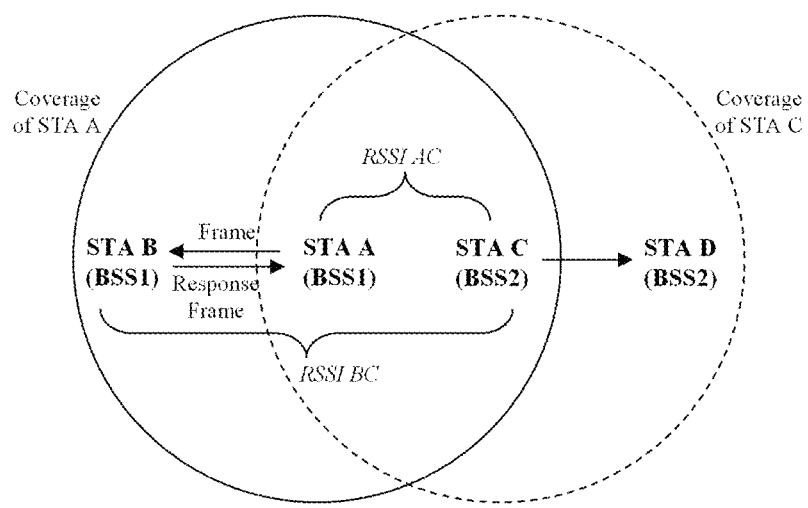
FIG. 6 shows a case where a BSS including a wireless communication terminal according to an embodiment of the present invention is overlapped with another BSS.

FIG. 6 shows a case where a BSS including a wireless communication terminal according to an embodiment of the present invention is overlapped with another BSS.

In the embodiment of FIG. 6, the first BSS BSS1 includes station A STA A and station B STA B. In addition, the second BSS BSS2 includes station C STA C and station D STA D. When the station C STA C transmits a PPDU to the station D STA D, the magnitude of an interference to the station B STA B may be smaller than the magnitude of an interference to the station A STA A. This is because both the stations A and B are included in the second BSS corresponding to the OBSS of the first BSS BSS1 but the distances from the station C are different. Therefore, based on the relative position of the OBSS receiving wireless communication terminal receiving the frame transmitted from the OBSS, the wireless communication terminal may estimate the magnitude of a potential interference that the transmission of the wireless communication terminal affects the reception of the OBSS receiving wireless communication terminal. At this time, the wireless communication terminal may estimate the potential interference based on the received signal strength (RSSI) of the PPDU transmitted by the OBSS receiving wireless communication terminal. Accordingly, the wireless communication terminal may estimate the potential interference based on the received signal strength (RSSI) of the PPDU transmitted by the OBSS receiving wireless communication terminal.

A data frame is transmitted by a transmission sequence including a plurality of transmissions. For example, the wireless communication terminal may transmit a data frame and receive an ACK/Block ACK frame. In addition, the wireless communication terminal may transmit a request to send (RTS) frame, receive a clear to send (CTS) frame, transmit a data frame, and receive an ACK frame. Therefore, the wireless communication terminal may estimate the interference that the transmission of the wireless communication terminal affects the reception of the response frame for the corresponding frame based on the received signal strength of any one frame in the transmission sequence.

The wireless communication terminal may transmit the PPDU based on the estimated potential interference. Specifically, the wireless communication terminal may increase the degree of spatial reuse. In a specific embodiment, the wireless communication terminal may adjust the transmission power of the PPDU to be transmitted in the SR operation. For example, when a wireless communication terminal receives a PPDU from a wireless communication terminal located a relatively long distance from the wireless communication terminal, the wireless communication terminal may transmit the PPDU with a transmission power larger than the transmission power used when the PPDU is received from the wireless communication terminal located at a relatively short distance. At this time, whether the wireless communication terminal is located at a relatively long distance may be determined based on the received signal strength value of the PPDU transmitted by the corresponding wireless communication terminal. In the embodiment of FIG. 6, when the station A STA A receives the PPDU to be transmitted to the station B STA B, the station C STA C may measure the received signal strength RSSI AC of the corresponding PPDU. When the station B STA B transmits a PPDU to the station A STA A, the station C STA C may determine the transmission power based on the measured received signal strength RSSI AC and transmit the PPDU to the station D STA D with the determined transmission power. In addition, the station C STA C may measure the received signal strength RSSI BC of the corresponding PPDU when the station B STA B transmits it to the station A STA A. At this time, when the RSSI AC is larger than the RSSI BC, when the station A STA A receives a PPDU from the station B STA B, the station C STA C may transmit the PPDU with a transmission power lower than the transmission power used when the station B STA B receives the PPDU from the station A STA A.

Also, the wireless communication terminal may change the CCA threshold value during the SR operation. Specifically, when a wireless communication terminal located at a relatively long distance from a wireless communication terminal receives the PPDU, the wireless communication terminal may use a clear channel assessment (CCA) threshold value that is larger than a CCA threshold value used when a wireless communication terminal located at a relatively short distance receives a PPDU. In this case, the CCA threshold value may be a reference value for determining whether the channel is idle. In the embodiment of FIG. 6, the station C STA C may measure the received signal strength RSSI AC of the PPDU that the station A STA A transmits to the station B STA B. When the station B STA B transmits a PPDU to the station A STA A, the station C STA C may determine the CCA threshold value based on the measured received signal strength RSSI AC and transmit the PPDU to the station D STA D based on the determined CCA threshold value. In addition, the station C STA C may measure the received signal strength RSSI BC of the PPDU that the station B STA B transmits to the station A STA A. At this time, when the RSSI AC is larger than the RSSI BC, when the station A STA A receives a PPDU from the station B STA B, the station C STA C may transmit the PPDU based on a CCA threshold value greater than a CCA threshold value used when the station B STA B receives the PPDU from the station A STA A.

In addition, the operation of increasing the degree of spatial reuse may include an operation of changing the CCA threshold value to a reference value when the CCA threshold value is smaller than the reference value. In addition, the operation of increasing the degree of spatial reuse may include an operation of resetting or reconfiguring an existing value of a network allocation vector (NAV) by a wireless communication terminal. At this time, the NAV is an indicator indicating that the wireless medium (WM) is busy for transmission between the other wireless communication terminals. When NAV is set in the wireless communication terminal, the wireless communication terminal may not be able to access the corresponding channel regardless of the CCA result. In addition, the operation of increasing the degree of spatial reuse may include an operation in which the wireless communication terminal transmits the PPDU irrespective of the CCA result. Specifically, the wireless communication terminal may perform CCA using an infinite CCA threshold value, and determine that the corresponding channel is always idle. In addition, the operation of increasing the degree of spatial reuse may include an operation in which the wireless communication terminal resets or reconfigures the NAV, and then transmits the PPDU based on the CCA using energy sensing.

In the above-described embodiments, the wireless communication terminal may increase the degree of spatial reuse based on the received signal strength of the PPDU transmitted by the OBBS receiving wireless communication terminal for a predetermined time period. At this time, the predetermined time period may be a time period during which the OBSS receiving wireless communication terminal receives the response PPDU for the PPDU transmitted by the OBSS receiving wireless communication terminal. In addition, a certain time period may indicate the number of designated frames. This is because the channel condition may be changed over time, and the wireless communication terminals included in the OBSS may move.

Figure 7:
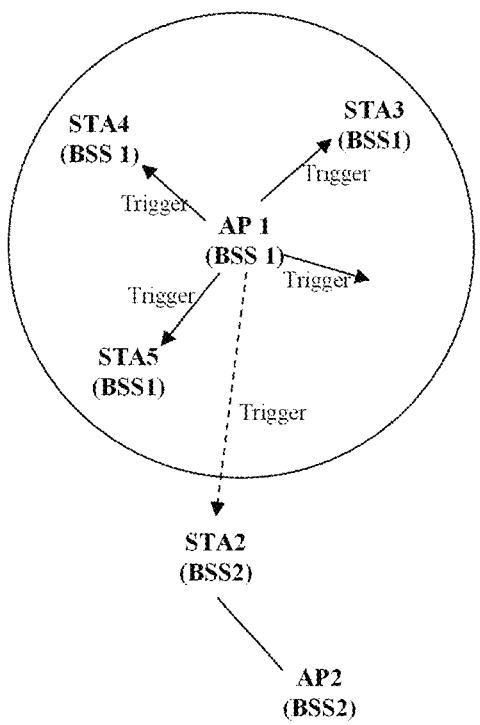
FIG. 7 shows that a wireless communication terminal according to an embodiment of the present invention performs an SR operation during an uplink multiplex transmission of an OBSS.

FIG. 7 shows that a wireless communication terminal according to an embodiment of the present invention performs an SR operation during an uplink multiplex transmission of an OBSS.

As described above, a general transmission sequence is initiated by a wireless communication terminal having a frame to be transmitted. Further, in order to consider reception of a frame transmitted from the OBSS, the wireless communication terminal must consider the relative position of the OBSS receiving wireless communication terminal or the distance between the wireless communication terminal and the OBSS receiving wireless communication terminal. At this time, the OBSS receiving wireless communication terminal indicates a wireless communication terminal receiving a frame transmitted from the OBSS. Further, the wireless communication terminal may determine the relative position of the OBSS receiving wireless communication terminal or the distance between the wireless communication terminal and the OBSS receiving wireless communication terminal based on the PPDU transmitted by the OBSS receiving wireless communication terminal. Accordingly, the wireless communication terminal must receive at least two PPDUs from the initiation of the transmission sequence to determine the relative position of the OBSS receiving wireless communication terminal or the distance between the wireless communication terminal and the OBSS receiving wireless communication terminal. Accordingly, it is possible to perform an operation of increasing the degree of spatial reuse (degree of spatial reuse) by receiving at least two PPDUs from the initiation of the transmission sequence.

However, in case of uplink (UL) multi-user (MU) transmission, an access point to receive a data frame may initiate a transmission sequence by transmitting a trigger frame. Specifically, a plurality of wireless communication terminals may receive a trigger frame from an access point and transmit the UL MU PPDU to the access point based on the trigger frame. Accordingly, the wireless communication terminal may initiate the operation of increasing the degree of spatial reuse from the middle of transmission of the PPDU transmitted based on the trigger frame. Specifically, the wireless communication terminal may initiate the operation of increasing the degree of spatial reuse after decoding the signaling field of the PPDU transmitted based on the trigger frame. The wireless communication terminal may determine whether the corresponding PPDU is the UL MU PPDU transmitted based on the trigger frame through the signaling field of the PPDU. In addition, the wireless communication terminal may increase the degree of spatial reuse based on the received signal strength of the PPDU including the trigger frame transmitted from the OBSS. In a specific embodiment, when a PPDU is transmitted based on a trigger frame in OBSS, the wireless communication terminal may determine the transmission power of the PPDU to be transmitted based on the received signal strength of the PPDU including the trigger frame transmitted from the OBSS.

Figure 8:
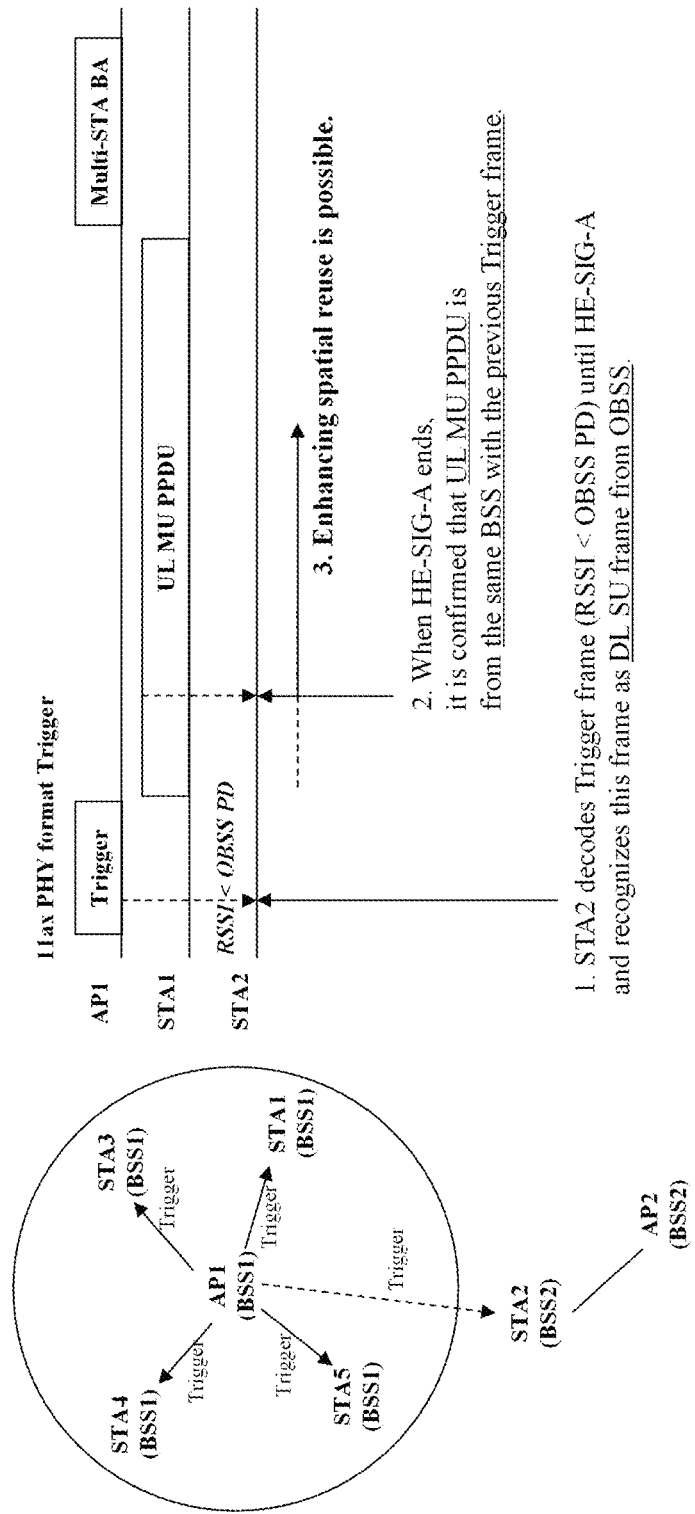
FIG. 8 shows that when a trigger frame is transmitted through the non-legacy PPDU format from OBSS, a wireless communication terminal according to an embodiment of the present invention performs an SR operation during an uplink multiplex transmission based on a trigger frame.

In the embodiment of FIG. 7, the OBSS receiving wireless communication terminal is the first access point APE Specifically, the first access point AP1 included in the first BSS BSS1 transmits the trigger frame to the third station STA3, the fourth station STA4, and the fifth station STA5. At this time, the second station STA2 included in the second BSS BSS2 may increase the degree of spatial reuse based on the PPDU including the trigger frame transmitted by the first access point APE Specifically, the second station STA2 may increase the degree of spatial reuse based on the received signal strength of the PPDU including the trigger frame transmitted by the first access point APE In a specific embodiment, when the third station STA3, the fourth station STA4, and the fifth station STA5 transmit the UL MU PPDU to the first access point AP1 based on the trigger frame transmitted by the first access point AP1, the second station STA2 may transmit the UL PPDU to the second access point AP2 included in the second BSS based on the PPDU including the trigger frame transmitted by the first access point APE FIG. 8 shows that when a trigger frame is transmitted through the non-legacy PPDU format from OBSS, a wireless communication terminal according to an embodiment of the present invention performs an SR operation during an uplink multiplex transmission based on a trigger frame.

As described above, the wireless communication terminal may initiate the operation of increasing the degree of spatial reuse after decoding the signaling field of the non-legacy PPDU format (11ax PHY format). This is because the signaling field of the non-legacy PPDU format may indicate that the corresponding PPDU is the UL MU PPDU. The wireless communication terminal may determine whether the PPDU received based on the signaling field of the non-legacy PPDU format is a PPDU transmitted based on the trigger frame received previously. At this time, the signaling field of the non-legacy PPDU format may include information identifying the BSS. Specifically, the signaling field of the non-legacy PPDU format may include BSS color. In a specific embodiment, the wireless communication terminal may determine whether the PPDU received based on the signaling field of the non-legacy PPDU format is a PPDU transmitted from the same BSS as the BSS where the trigger frame received previously is transmitted. When the received PPDU is transmitted from the same BSS as the BSS where the trigger frame received previously is transmitted, the wireless communication terminal may initiate the operation of increasing the degree of spatial reuse. Also, the signaling field of the non-legacy PPDU format may be the HE-SIG-A field. At this time, the HE-SIG-A field includes information required for interpreting the non-legacy PPDU.

Also, the wireless communication terminal may determine that the PPDU transmitted before the corresponding PPDU includes the trigger frame based on the signaling field of the non-legacy PPDU format. As described above, in the case of the UL MU transmission, the access point transmits the trigger frame and initiates the transmission sequence. Also, the trigger-based UL MU PPDU may be transmitted after a predetermined time from when the transmission of the trigger frame is completed.

Also, when the received signal strength value of the PPDU including the trigger frame is lower than the OBSS CCA threshold value, the wireless communication terminal may increase the degree of spatial reuse based on the trigger frame. In this case, the OBSS CCA threshold value represents a reference value applied to the CCA of the PPDU transmitted from the OBSS. Specifically, when the received signal strength of the PPDU transmitted from the OBSS is smaller than the OBSS CCA threshold value, the wireless communication terminal may determine that the channel is idle. Also, the OBSS CCA threshold value may be a Preamble Detection (PD) CCA threshold value, which is a CCA threshold value used in preamble detection.

Also, until the UL MU PPDU transmission based on the trigger frame is completed, the wireless communication terminal may increase the degree of spatial reuse based on the trigger frame. At this time, the wireless communication terminal may designate the ACK frame type to be transmitted to the wireless communication terminal as a delayed ACK. The delayed ACK type may indicate that the ACK frame is not forced to be transmitted within a predetermined time from when the data frame is transmitted. Accordingly, the wireless communication terminal may protect the ACK frame to be transmitted to the wireless communication terminal. Also, while the UL MU PPDU transmission based on the trigger frame is going, the wireless communication terminal may increase the degree of spatial reuse based on the trigger frame. Through this, the wireless communication terminal may protect the ACK frame transmitted from the OBSS and the ACK frame to be transmitted to the wireless communication terminal. In the embodiment of FIG. 8, the first BSS BSS1 includes a first access point AP1, a first station STA1, a third station STA3, a fourth station STA4, and a fifth station STA5. The second BSS BSS2 includes a second access point AP2 and a second station STA2. The first access point AP1 transmits the trigger frame through the non-legacy PPDU format to the first station STA1, the third station STA3, the fourth station STA4, and the fifth station STA5. The second station STA2 measures the received signal strength of the PPDU including the trigger frame transmitted by the first access point APE When the received signal strength of the PPDU is smaller than the OBSS PD CCA threshold value, the second station STA2 may initiate the operation of increasing the degree of spatial reuse during UL MU PPDU transmission based on the trigger frame.

At this time, the second station STA2 may determine whether the UL MU PPDU is transmitted based on the trigger frame, based on the signaling field of the UL MU PPDU. At this time, the second station STA2 may determine whether the UL MU PPDU and the PPDU including the trigger frame are transmitted from the same OBSS based on the signaling field of the UL MU PPDU. Specifically, the second station STA2 may determine whether the UL MU PPDU and the PPDU including the trigger frame are transmitted from the same OBSS based on the BSS color indicated by the signaling field of the UL MU PPDU. Also, the second station STA2 may increase the degree of spatial reuse during transmission of the UL MU PPDU as described above. In another specific embodiment, the second station STA2 may increase the degree of spatial reuse even after the transmission of the UL MU PPDU is completed, as described above. The operation of raising the degree of spatial reuse may include the embodiments described above.

Figure 9:
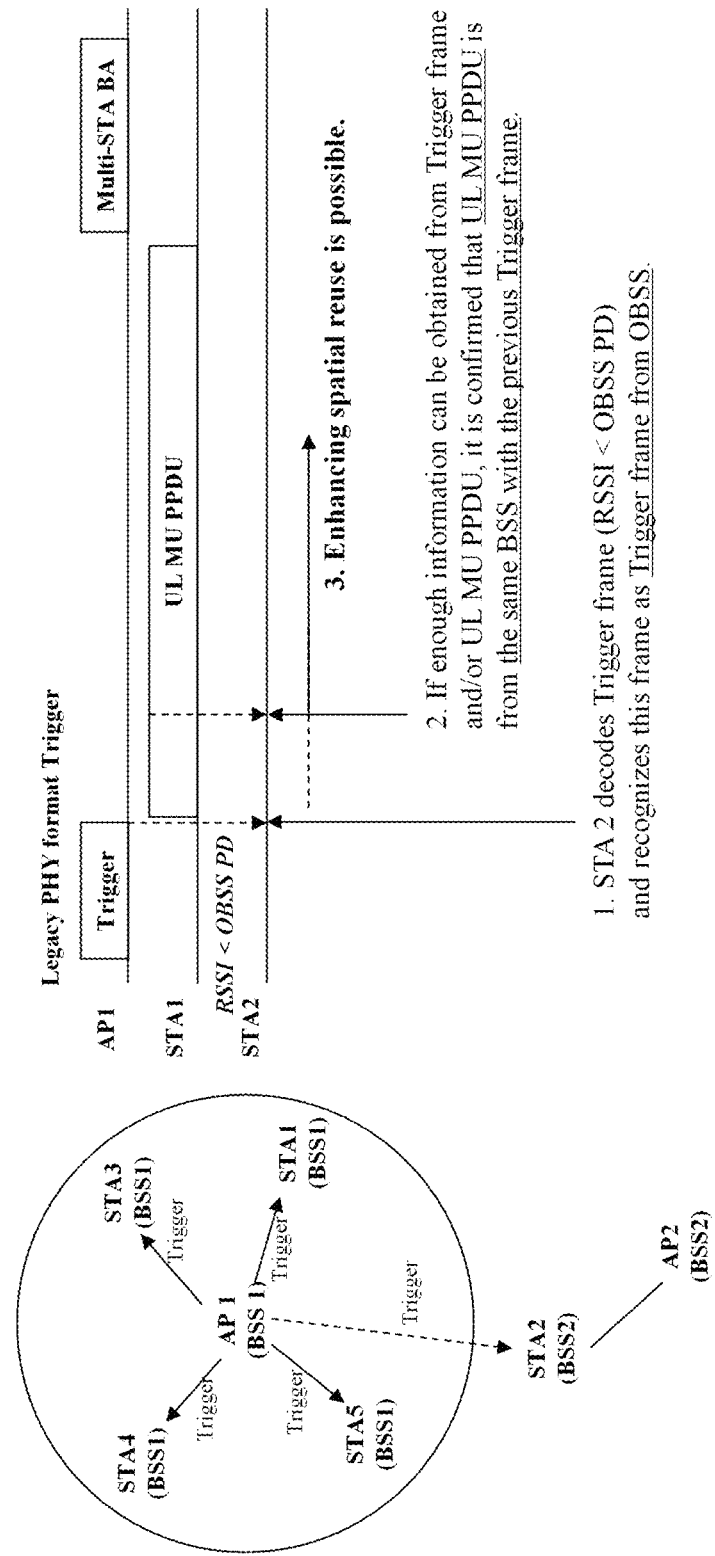
FIG. 9 shows that when a trigger frame is transmitted through the legacy PPDU format from OBSS, a wireless communication terminal according to an embodiment of the present invention performs an SR operation during an uplink multiplex transmission based on a trigger frame.

FIG. 9 shows that when a trigger frame is transmitted through the legacy PPDU format from OBSS, a wireless communication terminal according to an embodiment of the present invention performs an SR operation during an uplink multiplex transmission based on a trigger frame.

When the MAC frame is transmitted through the legacy PPDU format from the OBSS, the wireless communication terminal may decode the MAC frame to determine whether the corresponding MAC frame is the trigger frame. Specifically, the wireless communication terminal may determine whether the corresponding MAC frame is a trigger frame based on the frame type field of the MAC frame. At this time, the wireless communication terminal may determine whether the corresponding frame is a trigger frame based on the frame type field and the subtype field of the MAC frame. Also, the wireless communication terminal may determine whether the corresponding frame is an Inter-BSS frame by decoding the MAC header of the MAC frame. Specifically, the wireless communication terminal may determine whether the frame is an Inter-BSS frame based on the address field of the MAC header. In a specific embodiment, the wireless communication terminal may determine whether the corresponding frame is an Inter-BSS frame based on whether the receiving STA address (RA) field of the address field of the MAC header included in the UL MU PPDU transmitted based on a trigger matches the transmitting STA address (TA) field of the address field of the trigger frame. The wireless communication terminal may determine whether the corresponding frame is an Inter-BSS frame based on the information indicating the BSS of the frame. At this time, the information indicating the BSS may be a BSSID field. In addition, the information indicating the BSS may be a partial BSSID indicated by the AID field.

In the embodiment of FIG. 9, the first BSS BSS1 includes a first access point AP1, a first station STA1, a third station STA3, a fourth station STA4, and a fifth station STA5. The second BSS BSS2 includes a second access point AP2 and a second station STA2. The first access point AP1 transmits the trigger frame through the legacy PPDU format to the first station STA1, the third station STA3, the fourth station STA4, and the fifth station STA5. The second station STA2 may decode the MAC frame included in the PPDU transmitted by the first access point AP1 to determine whether the corresponding MAC frame is a trigger frame.

Specifically, the second station STA2 may determine whether the corresponding frame is an Inter-BSS frame based on the address field of the MAC header. In a specific embodiment, the second station STA2 may determine whether the corresponding frame is an Inter-BSS frame based on whether the RA field of the address field of the MAC header included in the UL MU PPDU transmitted based on a trigger frame matches the TA field of the trigger frame. Also, the second station STA2 may determine whether the corresponding frame is an Inter-BSS frame based on the information indicating the BSS of the MAC frame. At this time, the information indicating the BSS may be a BSSID field. In addition, the information indicating the BSS may be a partial BSSID indicated by the AID field. When the corresponding MAC frame is the trigger frame, the second station STA2 measures the received signal strength of the PPDU including the trigger frame transmitted by the first access point AP1. If the received signal strength of the PPDU is smaller than the OBSS PD CCA threshold value, the second station STA2 may initiate the operation of increasing the degree of spatial reuse during transmission of the trigger-based UL MU PPDU. Other operations of the second station STA2 may be the same as those of the embodiments described with reference to FIG. 8.

Figure 10:
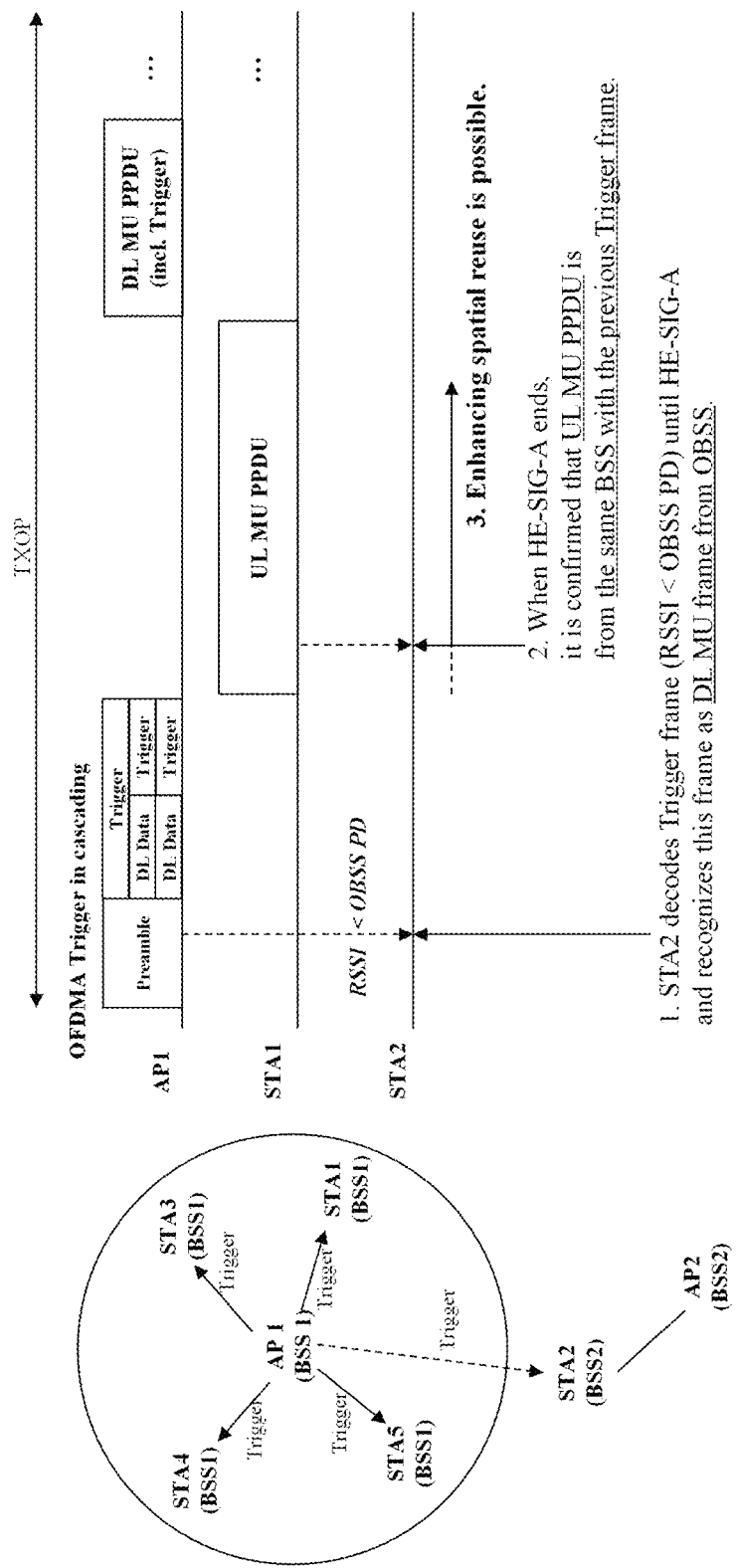
FIG. 10 shows that when a non-legacy PPDU including a trigger frame and a data frame together is transmitted in OBSS, a wireless communication terminal according to an embodiment of the present invention performs an SR operation during an uplink multiplex transmission based on a trigger frame.

FIG. 10 shows that when a non-legacy PPDU including a trigger frame and a data frame together is transmitted in OBSS, a wireless communication terminal according to an embodiment of the present invention performs an SR operation during an uplink multiplex transmission based on a trigger frame.

When the cascading sequence proceeds in the OBSS, the wireless communication terminal may increase the degree of spatial reuse during transmission of the UL MU PPDU transmitted based on the trigger frame. In this case, the cascading sequence is a transmission sequence in which both the UL MU transmission operation and the DL MU transmission operation are included in one transmission opportunity (TXOP). At this time, the TXOP indicates a time period in which a specific wireless communication terminal has an authority to initiate frame exchange via a wireless medium. The fact that the wireless communication terminal increases the degree of spatial reuse within the duration of the UL MU PPDU is to protect the downlink transmission to be continued after the uplink transmission. In addition, when the received signal strength of the UL MU PPDU transmitted based on the trigger frame is smaller than a certain threshold value, and the non-AP wireless communication terminals that are not access points participating in the cascading sequence are all the same, the wireless communication terminal may increase the degree of spatial reuse even after the UL MU PPDU transmission is completed. Specifically, the wireless communication terminal may increase the degree of spatial reuse within the TXOP indicated by the trigger frame. In addition, when the non-legacy MU PPDU is transmitted instead of the cascading sequence, the wireless communication terminal may increase the degree of spatial reuse within the time period described in the above-described embodiments. In this case, the time period may be the duration of the trigger-based UL PPDU transmitted from the OBSS. Also, the time period may be a TXOP indicated by the trigger frame transmitted from the OBSS.

In the embodiment of FIG. 10, the first BSS BSS1 includes a first access point AP1, a first station STA1, a third station STA3, a fourth station STA4, and a fifth station STA5. The second BSS BSS2 includes a second access point AP2 and a second station STA2. The first access point AP1 transmits downlink transmission data DL data and a trigger frame Trigger to the first station STA1, the third station STA3, the fourth station STA4, and the fifth station STA5. The second station STA2 measures the received signal strength of the PPDU transmitted by the first access point APE The second station STA2 may initiate to increase the degree of spatial reuse during transmission of a trigger-based UL MU PPDU. At this time, the trigger-based PPDU indicates the PPDU transmitted in response to the trigger frame. Specifically, the second station STA2 may increase the degree of spatial reuse after decoding the signaling field of the trigger-based UL MU PPDU. At this time, the signaling field of the UL MU PPDU may be the HE-SIG-A field. At this time, the second station STA2 may increase the degree of spatial reuse while the trigger-based UL MU PPDU is transmitted. At this time, if the received signal strength of the UL MU PPDU is smaller than a threshold value and the non-AP wireless communication terminals that are not access points participating in the cascading sequence are all the same, the second station STA2 may increase the degree of spatial reuse even after the UL MU PPDU transmission is completed. Other operations of the second station STA2 may be the same as those of the embodiments described with reference to FIG. 8.

Figure 11:
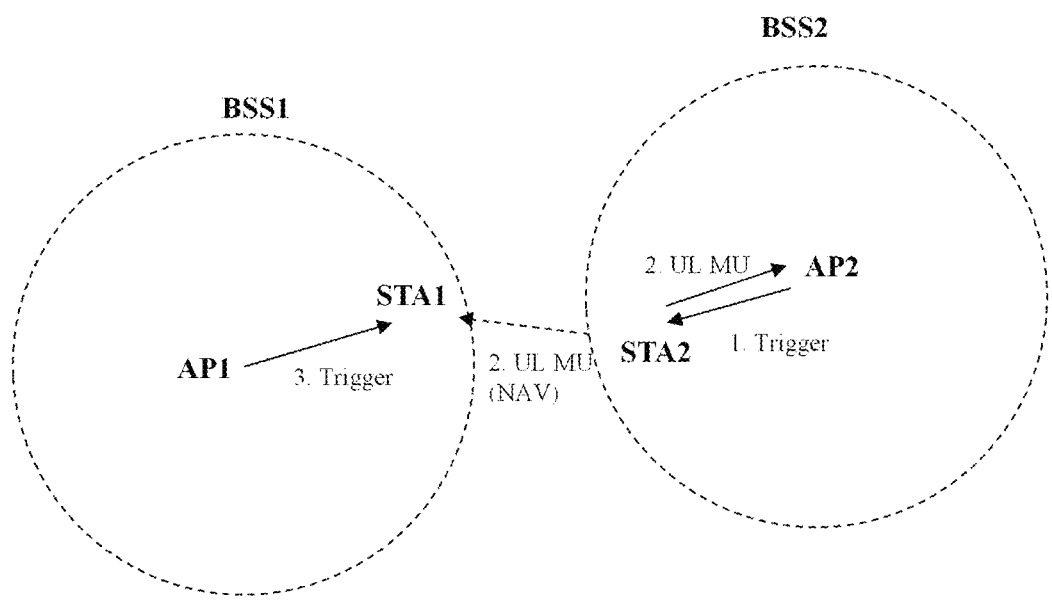
FIG. 11 shows that when a trigger-based UL MU PPDU is transmitted from OBSS, a wireless communication terminal according to an embodiment of the present invention sets a NAV.

FIG. 11 shows that when a trigger-based UL MU PPDU is transmitted from OBSS, a wireless communication terminal according to an embodiment of the present invention sets a NAV.

When the received signal strength of the PPDU including the trigger frame transmitted from the OBSS is smaller than a certain threshold value and the wireless communication terminal receives the trigger frame for triggering the wireless communication terminal, the wireless communication terminal may reset or not consider the NAV set according to the trigger-based UL MU PPDU transmitted from the OBSS. At this time, the specific threshold value may be an OBSS PD CCA threshold value. Since the received signal strength of the PPDU including the trigger frame transmitted from the OBSS is small, it may be determined that the interference expected to be given to the wireless communication terminal receiving the trigger-based UL MU PPDU is not large.

As described above, the received signal strength of the PPDU including the trigger frame may be smaller than a certain threshold value. At this time, if the transmission completion time of the trigger-based UL MU PPDU indicated by the trigger frame triggering the wireless communication terminal precedes the transmission completion time of the trigger-based UL MU PPDU transmitted from the OBSS, the wireless communication terminal may reset or ignore the NAV set according to the trigger-based UL MU PPDU transmitted from the OBSS. In the embodiment of FIG. 11, the first BSS BSS1 includes a first station STA1 and a first access point AP1. In addition, the second BSS BSS2 includes a second station STA2 and a second access point AP2. The second access point AP2 transmits the PPDU including the trigger frame to the second station STA2. At this time, the received signal strength of the PPDU including the trigger frame transmitted from the second BSS measured by the first station STA1 may be smaller than a certain threshold value. The received signal strength of the PPDU including the trigger frame transmitted in the second BSS may be smaller than a certain threshold value. In addition, the transmission completion time of the UL MU PPDU transmitted by the first station STA1 based on the trigger frame that the first access point AP1 transmits to the first station STA1 may precede the transmission completion time of the UL MU PPDU transmitted based on the trigger frame transmitted from the second BSS. At this time, the first station STA1 may reset or ignore the NAV set according to the trigger-based UL MU PPDU transmitted from the second BSS. Through this, the wireless communication terminal may protect the ACK frame for the UL MU PPDU transmitted from the OBSS.

Figures 12, 13:
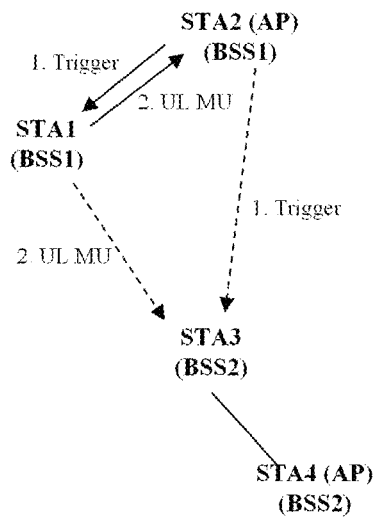
FIG. 12 shows an operation of a wireless communication terminal according to an embodiment of the present invention to increase the degree of spatial reuse when a UL MU PPDU is transmitted from OBSS.
FIG. 13 shows an SR operation of a wireless communication terminal according to an embodiment of the present invention when a PPDU including a trigger frame is transmitted from the OBSS.

FIG. 12 shows an operation of a wireless communication terminal according to an embodiment of the present invention to increase the degree of spatial reuse when a UL MU PPDU is transmitted from OBSS.

In the above-described embodiment, when the received signal strength of the PPDU including the trigger frame transmitted from the OBSS measured by the wireless communication terminal is smaller than a certain threshold value, the wireless communication terminal may increase the degree of spatial reuse. At this time, the specific threshold value may be a value determined based on the magnitude of an interference acceptable by the wireless communication terminal of the OBSS when receiving the UL MU PPDU transmitted based on the trigger frame in the OBSS. Also, the specific threshold value may be a value determined based on the transmission power of the PPDU including the trigger frame transmitted in the OBSS. Also, the specific threshold value may be a value determined based on the transmission power of the PPDU to be transmitted by the wireless communication terminal. Specifically, a specific threshold value may be determined according to the following equation.

$$TXPWR\_OBSS\_AP + AcceptableReceiverInterferenceLevel\_OBSS\_AP - TXPWR\_MY\_STA$$

At this time, TXPWR_OBSS_AP represents the transmission power of the PPDU including the trigger frame transmitted from the OBSS. Also, AcceptableReceiverInterferenceLevel_OBSS_AP represents the amount of an interference acceptable by the wireless communication terminal of the OBSS to receive the trigger-based UL MU PPDU. In addition, TXPWR_MY_STA represents the transmission power of the PPDU to be transmitted by the wireless communication terminal.

Specifically, when the received signal strength of the PPDU including the trigger frame received by the wireless communication terminal satisfies the following equation, the wireless communication terminal may increase the degree of spatial reuse.

$$RSSI\_TriggerFrame\_at\_MY\_STA < TXPWR\_OBSS\_AP + AcceptableReceiverInterferenceLevel\_OBSS\_AP - TXPWR\_MY\_STA$$

RSSI_TriggerFrame_at_MY_STA represents the received signal strength of the PPDU including the trigger frame transmitted from the OBSS measured by the wireless communication terminal.

For this operation, the wireless communication terminal transmitting the trigger frame may signal the magnitude of an interference acceptable when receiving the trigger-based UL MU PPDU through the trigger frame. In addition, the wireless communication terminal transmitting the trigger frame may signal the transmission power of the PPDU including the trigger frame through the trigger frame. At this time, the wireless communication terminal receiving the trigger frame transmitted from the OBSS may increase the degree of spatial reuse based on at least any one of the magnitude of an interference acceptable when receiving the UL MU PPDU signaled by the wireless communication terminal transmitting the trigger frame and the transmission power of the PPDU including the trigger frame. Specifically, the wireless communication terminal receiving the trigger frame transmitted from the OBSS may determine whether the above-described equation is satisfied based on the trigger frame. In a specific embodiment, the wireless communication terminal receiving the trigger frame transmitted from the OBSS may obtain the magnitude of an interference acceptable when receiving the UL MU PPDU transmitted based on the trigger frame from the signaling field of the PPDU including the trigger frame. In addition, the wireless communication terminal transmitting the trigger frame may signal the transmission power of the PPDU including the trigger frame through the trigger frame. At this time, the signaling field of the PPDU may be the HE-SIG-A field. Also, the signaling field of the PPDU may be the Spatial Reuse (SR) field of the HE-SIG-A field.

The operation of increasing the degree of spatial reuse of the wireless communication terminal as described above may be determined based on the channel attenuation between a wireless communication terminal of the OBSS that transmits a trigger frame and the wireless communication terminal. Specifically, the above-described equation may be expressed as follows.

TXPWR_MY_STA−(TXPWR_OBSS_AP−RSSI_
TriggerFrame_at_MY_STA)<AcceptableReceiverInterferenceLevel_OBSS_AP (TXPWR_OBSS_AP−RSSI_TriggerFrame_at_MY_STA) represents how much the transmission power is attenuated while the PPDU including the trigger frame transmitted from the OBBS is transmitted to the wireless communication terminal. Therefore, (TXPWR_OBSS_AP−RSSI_TriggerFrame_at_MY_STA) may be regarded as channel attenuation. In addition, (TXPWR_MY_STA−(TXPWR_OBSS_AP−RSSI_TriggerFrame_at_MY_STA)) may be regarded as the magnitude of an interference that the PPDU to be transmitted by the wireless communication terminal affects a wireless communication terminal to receive the trigger-based UL MU PPDU in the OBSS. Accordingly, it may be understood that the above equation determines whether the magnitude of an interference occurring in a wireless communication terminal to receive a trigger-based UL MU PPDU in the OBSS is smaller than the magnitude of an interference acceptable by the wireless communication terminal to receive a trigger-based UL MU PPDU when the wireless communication terminal transmits a PPDU.

The wireless communication terminal may adjust the transmission power of the PPDU to be transmitted based on the above-described equation. Specifically, when receiving the UL MU PPDU transmitted based on the trigger frame of the OBSS, the wireless communication terminal may determine the transmission power of the PPDU to be transmitted based on the magnitude of the interference acceptable by the wireless communication terminal of the OBSS. Also, the wireless communication terminal may determine the transmission power of the PPDU to be transmitted based on the transmission power of the PPDU including the trigger frame transmitted from the OBSS. The wireless communication terminal may increase the degree of spatial reuse while not interfering with the reception of the UL MU PPDU in the OBSS.

Also, when the above-described equation is satisfied, the wireless communication terminal may use a CCA threshold value higher than the existing CCA threshold value. In this case, the CCA threshold value higher than the existing CCA threshold value may be the OBSS PD CCA threshold value. Through the adjustment of the CCA threshold value, it is possible to prevent a collision with a transmission of another wireless communication terminal performing an SR operation according to a PPDU including a trigger frame transmitted from the OBSS.

In another specific embodiment, when the above-described equation is satisfied, the wireless communication terminal may determine that the corresponding channel is idle. In another specific embodiment, when the above-described equation is satisfied, the wireless communication terminal may transmit the PPDU without CCA operation.

In addition, the wireless communication terminal may increase the degree of spatial reuse while the trigger-based UL MU PPDU of the OBSS is transmitted. Specifically, the wireless communication terminal may transmit the PPDU by adjusting the transmission power while the trigger-based UL MU PPDU of the OBSS is transmitted. Through this, the wireless communication terminal may protect the transmission of the ACK frame to the trigger-based UL MU PPDU of the OBSS.

As described above, the wireless communication terminal may signal through the trigger frame at least any one of the magnitude of the interference acceptable when receiving the trigger-based UL MU PPDU and the transmission power of the PPDU including the trigger frame. For convenience of explanation, the magnitude of the interference that acceptable when receiving the trigger-based UL MU PPDU is referred to as the allowable interference magnitude. At this time, the wireless communication terminal transmitting the trigger-based UL MU PPDU may signal the magnitude of the allowed interference of the wireless communication terminal transmitting the trigger frame through the signaling field of the UL MU PPDU. In addition, the wireless communication terminal transmitting the trigger-based UL MU PPDU may signal the transmission power of the PPDU including the trigger frame through the signaling field of the UL MU PPDU. At this time, the signaling field may be the HE-SIG-A field. Specifically, the signaling field may be a Spatial Reuse (SR) field included in the HE-SIG-A field.

At this time, the wireless communication terminal transmitting the trigger-based UL MU PPDU may obtain the allowable interference magnitude of the wireless communication terminal that transmits the trigger frame from the subfield of the trigger frame. In addition, the wireless communication terminal transmitting the trigger-based UL MU PPDU may obtain the transmission power of the PPDU including the trigger frame from the subfield of the trigger frame. Specifically, the subfield of the trigger frame may be a common field of the trigger frame. For example, the subfield of the trigger frame may be the SR field of the common field of the trigger frame.

Accordingly, the wireless communication terminal that increases the degree of spatial reuse based on the PPDU including the trigger frame transmitted from the OBSS may obtain the allowable interference magnitude of the wireless communication terminal that transmits the trigger frame through the signaling field of the corresponding trigger-based UL MU PPDU. In addition, the wireless communication terminal that increases the degree of spatial reuse based on the PPDU including the trigger frame transmitted from the OBSS may obtain the transmission power of the PPDU including the trigger frame through the signaling field of the corresponding trigger-based UL MU PPDU.

For the above-described embodiments, the wireless communication terminal must be able to determine whether the PPDU transmitted from the OBSS is a PPDU based on a trigger frame in which the wireless communication terminal measures the received signal strength. Specifically, the wireless communication terminal may determine whether the PPDU transmitted from the OBSS is a PPDU based on a trigger frame in which the wireless communication terminal measures the received signal strength according to whether the BSS color of the PPDU including the trigger frame in which the wireless communication terminal measures the received signal strength and the BSS color of the PPDU transmitted from the OBSS. In another specific embodiment, after a predetermined time from when the transmission of the PPDU received by the wireless communication terminal is completed, when a PPDU based on a trigger frame is transmitted from the OBSS, the wireless communication terminal may determine that the PPDU received before the trigger-based PPDU is the PPDU including the trigger frame. At this point, the predetermined time may be a Short Inter-Frame Space (SIFS).

At this time, the wireless communication terminal may decode the MAC header of the received PPDU and determine whether the received PPDU includes the trigger frame. In addition, when the trigger-based PPDU is transmitted, the wireless communication terminal may determine the PPDU transmitted before the PPDU transmission based on the trigger frame as the PPDU including the trigger frame. Specifically, when the downlink transmission PPDU is transmitted and the trigger-based PPDU is continuously transmitted, the wireless communication terminal may determine the PPDU transmitted before the PPDU transmission based on the trigger frame as the PPDU including the trigger frame. In this embodiment, the wireless communication terminal may receive the trigger-based PPDU or decode the MAC header of the received PPDU, and then determine whether the received PPDU includes the trigger frame.

The wireless communication terminal transmitting the trigger frame may signal the PPDU including the trigger frame through the signaling field of the PPDU including the trigger frame. At this time, the wireless communication terminal may determine that the PPDU received based on the signaling field of the PPDU is a PPDU including the trigger frame. At this time, the signaling field may be the HE-SIG-A field. Also, the signaling field may be the SR field of the HE-SIG-A field. At this time, the wireless communication terminal may decode the signaling field of the received PPDU and determine whether the received PPDU is a PPDU including a trigger frame. Therefore, it may be determined that the PPDU received a little earlier than the above-described embodiments is a PPDU including the trigger frame.

As in the above-described embodiments, while the trigger-based PPDU is transmitted from the OBSS, the wireless communication terminal transmits the PPDU based on the PPDU including the trigger frame transmitted from the OBSS and this may be referred to as an opportunistic adaptive CCA (OA-CCA).

FIG. 13 shows an SR operation of a wireless communication terminal according to an embodiment of the present invention when a PPDU including a trigger frame is transmitted from the OBSS.

When the wireless communication terminal performs the SR operation based on the PPDU including the trigger frame transmitted from the OBSS and transmits the PPDU, the wireless communication terminal triggered by the trigger frame may detect interference caused by transmission of the wireless communication terminal and determine that the corresponding channel is busy. Accordingly, the wireless communication terminal triggered by the trigger frame may not be able to transmit the trigger-based PPDU. To prevent this, the wireless communication terminal may perform the SR operation within the duration of the PPDU including the trigger frame transmitted from the OBSS. Specifically, the wireless communication terminal may transmit the PPDU based on the SR operation within the duration of the PPDU including the trigger frame transmitted from the OBSS.

At this time, the wireless communication terminal may change the SR operation according to the type of the PPDU transmitted from the OBSS. Specifically, when the PPDU including the trigger frame transmitted from the OBSS is a non-legacy PPDU for extended range transmission, the wireless communication terminal may not transmit the PPDU based on the SR operation while the PPDU including the trigger frame is transmitted. In addition, when the PPDU including the trigger frame transmitted from the OBSS is a non-legacy PPDU for a single user (SU) transmission, the wireless communication terminal may not transmit the PPDU based on the SR operation while the PPDU including the trigger frame is transmitted. The duration of non-legacy PPDUs for extended range transmission and non-legacy PPDUs for single user transmission may not be longer than that of other types of PPDUs.

In addition, if the PPDU including the trigger frame transmitted from the OBSS is a non-legacy PPDU for a multi-user (MU), the wireless communication terminal may transmit the PPDU based on the SR operation within the duration of the PPDU including the trigger frame. As described above, the signaling field of a PPDU may indicate that the corresponding PPDU includes a trigger frame. Specifically, a specific value of the SR field of HE-SIG-A may indicate that it includes a corresponding PPDU trigger frame. Also, the signaling field of the PPDU may indicate that the corresponding PPDU is a PPDU for downlink transmission. At this time, the signaling field of the PPDU is a PPDU for downlink transmission, and when the SR field has a specific value, the SR field may indicate that corresponding PPDU includes trigger frame. At this time, when the PPDU is a PPDU for uplink transmission, the specific value of the SR field may be used for another purpose.

Figure 14:
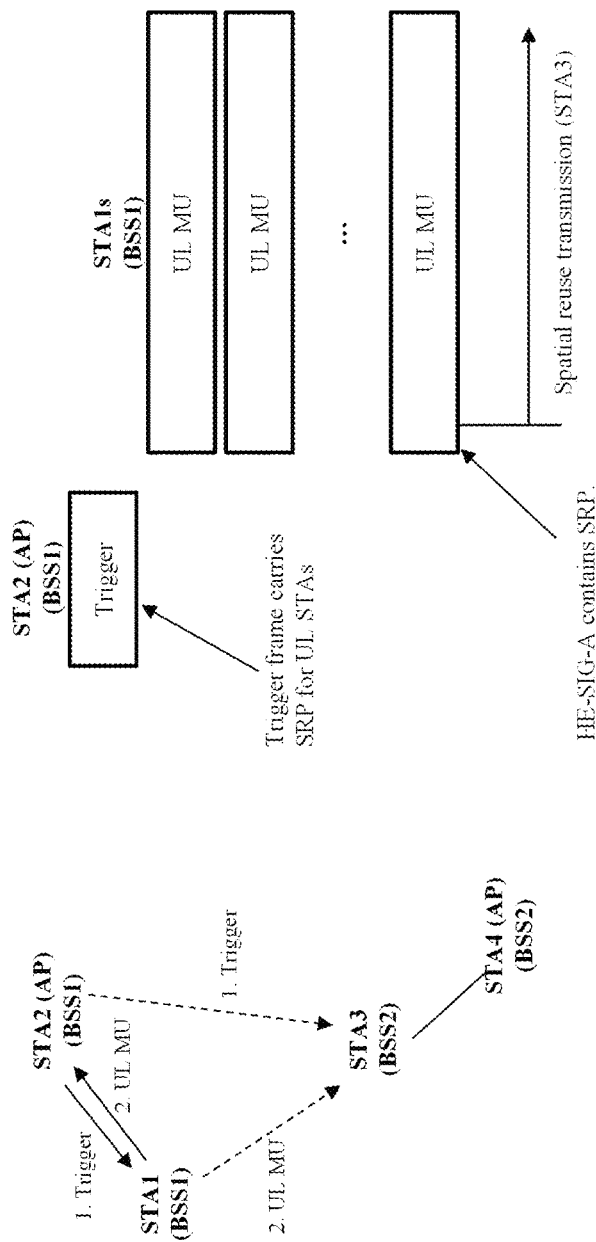
FIG. 14 shows an SR operation of a wireless communication terminal according to an embodiment of the present invention when a PPDU including a trigger frame is transmitted from the OBSS.

FIG. 14 shows an SR operation of a wireless communication terminal according to an embodiment of the present invention when a PPDU including a trigger frame is transmitted from the OBSS.

The wireless communication terminal may adjust the transmission power of the PPDU to be transmitted based on the equation described with reference to FIG. 12. Specifically, when receiving the UL MU PPDU transmitted based on the trigger frame of the OBSS, the wireless communication terminal may determine the transmission power of the PPDU to be transmitted based on the magnitude of the interference acceptable by the wireless communication terminal of the OBSS. Also, the wireless communication terminal may determine the transmission power of the PPDU to be transmitted based on the transmission power of the PPDU including the trigger frame transmitted from the OBSS. At this time, the wireless communication terminal transmitting the trigger frame may signal at least one of the allowable interference magnitude and the transmission power of the trigger frame through the trigger frame as described with reference to FIG. 12. Specifically, a wireless communication terminal transmitting a trigger frame may transmit spatial reuse field parameters (SRP) through a trigger frame. At this time, the value of the SRP may be determined based on the allowable interference magnitude and the transmission power of the trigger frame. Specifically, the SRP may be the sum of the transmission power of the PPDU including the trigger frame and the allowable interference magnitude of the wireless communication terminal transmitting the trigger frame. In addition, the wireless communication terminal transmitting the trigger-based PPDU may insert the SRP into the signaling field of the PPDU. The wireless communication terminal may obtain the SRP from the trigger-based PPDU transmitted from the OBSS and determine the transmission power of the PPDU to be transmitted based on the SRP. Specifically, the wireless communication terminal may determine the transmission power of the PPDU to be transmitted according to the following equation.

TXPWR_MY_STA<SRP−RSSI_Trigger-Frame_at_MY_STA

SRP=TXPWR_OBSS_AP+AcceptableReceiverInterferenceLevel_OBSS_AP

At this time, TXPWR_OBSS_AP represents the transmission power of the PPDU including the trigger frame transmitted from the OBSS. Also, AcceptableReceiverInterferenceLevel_OBSS_AP indicates an allowable interference magnitude, which is the magnitude of interference acceptable by the wireless communication terminal of the OBSS to receive the trigger-based UL MU PPDU. In addition, TXPWR_MY_STA represents the transmission power of the PPDU to be transmitted by the wireless communication terminal. In addition, RSSI_TriggerFrame_at_MY_STA represents the received signal strength of the PPDU including the trigger frame transmitted from the OBSS measured by the wireless communication terminal.

Therefore, the wireless communication terminal may determine the transmission power based on the received signal strength of the PPDU including the trigger frame transmitted from the OBSS and the SRP value indicated by the signaling field of the trigger-based PPDU transmitted from the OBSS.

In the embodiment of FIG. 14, the first BSS BSS1 includes a first station STA1 which is not an access point and a second station STA2 which is an access point. The second BSS BSS2 includes a fourth station STA4 which is an access point and a third station STA3 which is not an access point. The second station STA2 transmits the trigger frame to the first station STA1. At this time, the second station STA2 may insert the SRP into the trigger frame. The third station STA3 measures the received signal strength of the PPDU including the trigger frame transmitted by the second station STA2. Also, the first station STA1 transmits the trigger-based UL PPDU. At this time, the first station STA1 may insert the SRP into the signaling field of the trigger-based UL PPDU. The third station STA3 may obtain the SRP value from the signaling field of the trigger-based UL PPDU transmitted by the first station STA1. When the transmission power value of the PPDU to be transmitted from the third station STA3 to the fourth station STA4 is smaller than the value obtained by subtracting the received signal strength of the PPDU including the trigger frame transmitted from the second station STA2 from the value of the SRP, the third station STA3 may transmit the PPDU to the fourth station STA4.

The magnitudes of transmission power and interference may be values normalized over the 20 MHz frequency bandwidth. For example, TXPWR=power−10*log(BW/20 MHz). Thus, the SRP may be a normalized value over the 20 MHz frequency bandwidth. Accordingly, the wireless communication terminal may scale the transmission power value of the PPDU to be transmitted according to the frequency bandwidth used by the PPDU to be transmitted and apply it to the above-described equation.

When receiving a wireless signal, the wireless communication terminal may process the received signal in a physical layer and a MAC layer. At this time, the interface between the physical layer and the MAC layer is called a primitive. In addition, the operation of the physical layer of the wireless communication terminal may be performed by the PHY Sublayer Management Entity (PLME). In addition, the operation of the MAC layer of the wireless communication terminal may be performed by the MAC Sublayer Management Entity (MLME). At this time, for the embodiments described above, RXVECTOR of the primitive may include at least one of a spatial reuse parameter (SRP), a TXOP duration, and a BSS color.

Figure 15:
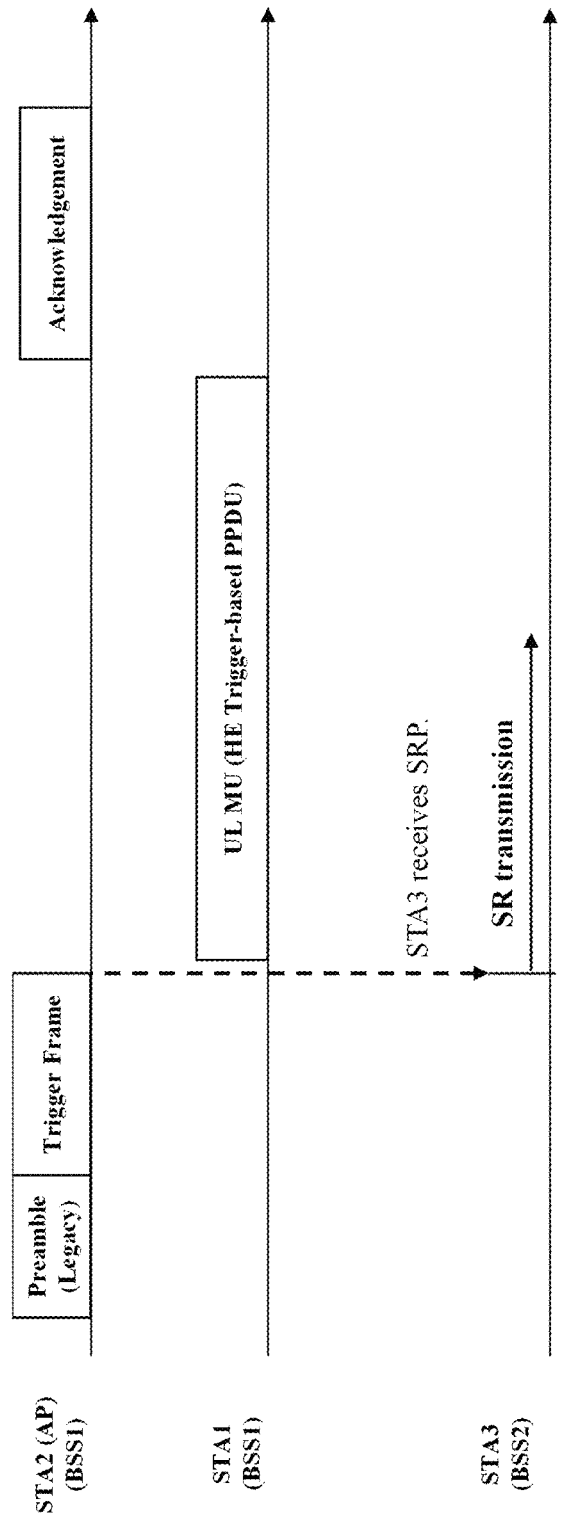
FIG. 15 shows an SR operation of a wireless communication terminal according to an embodiment of the present invention when a legacy PPDU including a trigger frame is transmitted from the OBSS.

FIG. 15 shows an SR operation of a wireless communication terminal according to an embodiment of the present invention when a legacy PPDU including a trigger frame is transmitted from the OBSS.

As described with reference to FIG. 14, the wireless communication terminal may transmit the PPDU according to the SR operation based on the received signal strength of the PPDU including the trigger frame transmitted from the OBSS and the value of the SRP indicated by the trigger-based PPDU. Specifically, the wireless communication terminal may transmit the PPDU by adjusting the transmission power based on the received signal strength of the PPDU including the trigger frame transmitted from the OBSS and the value of the SRP indicated by the trigger-based PPDU. However, when the PPDU including the trigger frame is a legacy PPDU, the wireless communication terminal is required to decode the MAC frame of the corresponding PPDU to determine whether the corresponding PPDU includes the trigger frame. In addition, when the BSS indicated by the signaling field of the PPDU is different from the BSS indicated by the address field of the MAC header, the wireless communication terminal is required to decode the MAC frame of the corresponding PPDU. At this time, the wireless communication terminal may obtain the value of the SRP from the trigger frame. The wireless communication terminal may transmit the PPDU by adjusting the transmission power based on the SRP value obtained from the trigger frame of the OBSS. Specifically, as described above, the wireless communication terminal may adjust the transmission power of the PPDU to be transmitted so as to satisfy the following equation.

TXPWR_MY_STA<SRP−RSSI_Trigger-Frame_at_MY_STA

At this time, the wireless communication terminal may transmit the PPDU by adjusting the transmission power at the time of obtaining the SRP value. In another specific embodiment, the wireless communication terminal may initiate the transmission of the PPDU by adjusting the transmission power at the end of the transmission of the PPDU including the trigger frame transmitted from the OBSS. In the embodiment of FIG. 15, it is shown that at the end of the transmission of the PPDU including the trigger frame transmitted from the OBSS, the wireless communication terminal adjusts the transmission power to transmit the PPDU. In another specific embodiment, when the PPDU including the trigger frame is a legacy PPDU, the wireless communication terminal may transmit the PPDU by adjusting the transmission power at the time when the corresponding PPDU identifies the trigger frame transmitted from the OBSS. In these embodiments, the wireless communication terminal may transmit the PPDU based on the SR operation at a time point earlier than the embodiment described with reference to FIG. 14.

Figure 16:
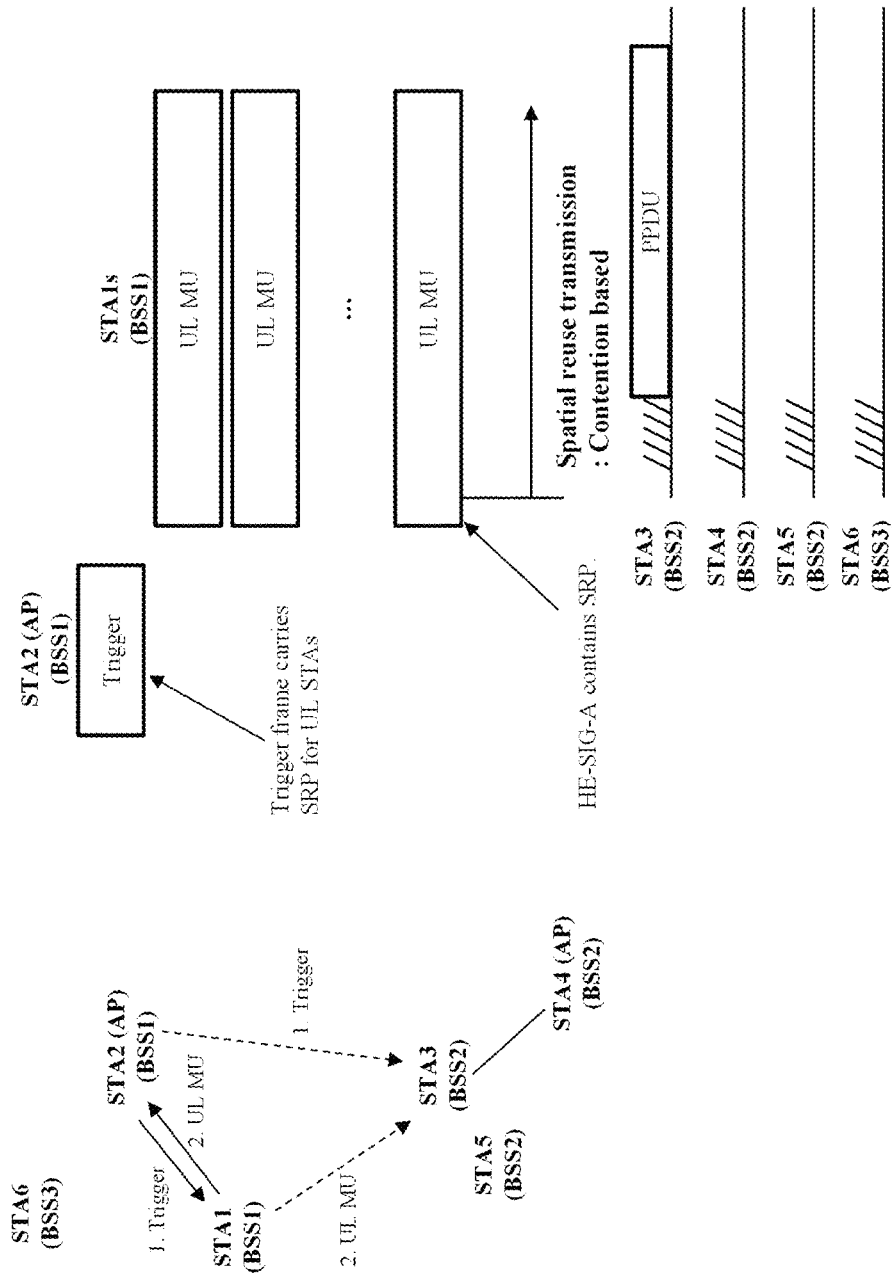
FIG. 16 shows that a wireless communication terminal according to an embodiment of the present invention performs an SR operation based on a contention procedure when a PPDU including a trigger frame is transmitted from the OBSS.

FIG. 16 shows that a wireless communication terminal according to an embodiment of the present invention performs an SR operation based on a contention procedure when a PPDU including a trigger frame is transmitted from the OBSS.

As described above, the wireless communication terminal may transmit the PPDU based on the PPDU including the trigger frame transmitted from the OBSS during the trigger-based PPDU transmission procedure from the OBSS. Specifically, the wireless communication terminal may transmit a PPDU under the condition of the equation described in the embodiment of FIG. 12. In the specific embodiment, the wireless communication terminal may transmit the PPDU by adjusting the transmission power according to the equations described in the embodiments of FIGS. 12 and 14.

One or a plurality of wireless communication terminals in the UL MU transmission procedure in the OBSS may transmit the PPDU based on the SR operation. When a plurality of wireless communication terminals transmit PPDUs based on the SR operation, a collision may occur between transmissions of different wireless communication terminals. Further, when a plurality of wireless communication terminals transmit PPDUs, interference exceeding the magnitude of the interference acceptable by the access point of the OBSS may occur.

In the embodiment of FIG. 16, the first BSS BSS1 includes a first station STA1 other than an access point and a second station STA2 which is an access point. In addition, the second BSS BSS2 also includes a third station STA3 other than an access point, a fourth station STA4 which is an access point, and a fifth station STA5 other than an access point. Also, the third BSS BSS 3 includes the sixth station STA 6. When the third to sixth stations STA3 to STA6 transmit PPDUs at the same time, transmission of the third station STA3 to the sixth station STA6 may fail due to a transmission collision. In addition, the third station STA3 and the fifth station STA5 may simultaneously transmit PPDUs to the fourth station STA4. In addition, when two of the third to sixth stations STA3 to STA6 transmit PPDUs, interference greater than the magnitude of the interference acceptable by the second station STA2 may occur. Accordingly, the second station STA2 may not receive the PPDU from the first station STA1. To solve this problem, when a wireless communication terminal transmits a PPDU based on the SR operation in the UL MU transmission procedure in the OBSS, the wireless communication terminal may access the channel based on a backoff procedure.

When the wireless communication terminal transmits the PPDU based on the SR operation in the UL MU transmission procedure in the OBSS, the wireless communication terminal may reduce the backoff counter by a predetermined time period when the channel is idle for a predetermined time period or more. At this time, a certain time period may be referred to as a slot. At this time, the wireless communication terminal may use the backoff counter value used when accessing the channel through the DCF and the EDCAF as the backoff counter value. Further, in order to determine whether the channel is idle, the wireless communication terminal may use Energy Detect (ED). Also, the wireless communication terminal may determine whether the channel is idle by determining whether there is a PPDU having an strength equal to or greater than a threshold value. In this case, the threshold value may be a value larger than the existing minimum receive sensitivity. For example, the wireless communication terminal may perform a CCA operation based on a color code, on the basis of the OBSS PD CCA threshold value used as the threshold value for Preamble Detection (PD) of the OBSS in the color code based CCA. When an inter-BSS PPDU is transmitted, the color code based CCA may indicate that the wireless communication terminal uses an OBSS PD CCA threshold value higher than the minimum receive sensitivity. At this time, the wireless communication terminal may determine whether the received PPDU is inter-BSS or intra-BSS based on the BSS color or the MAC address.

In another specific embodiment, the wireless communication terminal may perform CCA using a threshold value that is higher than the OBSS PD CCA threshold value. In another specific embodiment, the wireless communication terminal may reduce the backoff counter without CCA. Specifically, the wireless communication terminal may reduce the backoff counter over time regardless of whether the channel is idle or not. As described above, the wireless communication terminal may use the backoff counter value used when accessing the channel through the DCF and the EDCF as the backoff counter value. Through these embodiments, the wireless communication terminal may obtain a large number of transmission opportunities during the UL PPDU transmission procedure in the OBSS.

In addition, when the wireless communication terminal transmits the PPDU based on the SR operation in the UL PPDU transmission procedure in the OBSS, the wireless communication terminal may determine whether the energy level of the channel to which the PPDU is transmitted changes. Specifically, when the wireless communication terminal transmits the PPDU based on the SR operation in the UL MU transmission procedure from the OBSS, the wireless communication terminal may determine whether the change of the energy level of the channel through which the PPDU is transmitted is equal to or greater than a reference value. When the wireless communication terminal detects a change in the energy level of the channel through which the PPDU is to be transmitted, the wireless communication terminal may stop the PPDU transmission. When there is a change in the energy level of the channel to which the PPDU is transmitted, during the OBSS UL PPDU transmission procedure, this is because another wireless communication terminal may initiate the PPDU transmission based on the SR operation. In addition, only a wireless communication terminal whose backoff counter value is less than or equal to a specific value at the initiation of OA-CCA may transmit a PPDU based on the SR operation. Specifically, only a wireless communication terminal whose backoff counter value is less than or equal to a specific value at the initiation of UL PPDU transmission in the OBSS may transmit a PPDU based on the SR operation. For example, when only a wireless communication terminal having a backoff counter value of 1 or less at the initiation of UL PPDU transmission in the OBSS transmits a PPDU, it is possible to prevent a plurality of wireless communication terminals from performing transmission simultaneously. Also, if the wireless communication terminal determines the transmission power of the PPDU to be transmitted during the UL PPDU transmission procedure in the OBSS, it may not be allowed to change the transmission power thereafter. After the wireless communication terminal determines the transmission power of the PPDU, if the transmission power is changed according to the PPDU transmission condition, this is because more wireless communication terminals simultaneously transmit PPDUs. The wireless communication terminal may minimize the interference that may occur in receiving the UL PPDU in the OBSS through these embodiments.

Also, when the wireless communication terminal attempts to transmit PPDU during the UL PPDU transmission procedure in the OBSS and then stops, the wireless communication terminal may regard the corresponding channel as being busy during the remaining UL PPDU transmission duration. Through this, the wireless communication terminal may protect the UL PPDU transmission in the OBSS.

Figure 17:
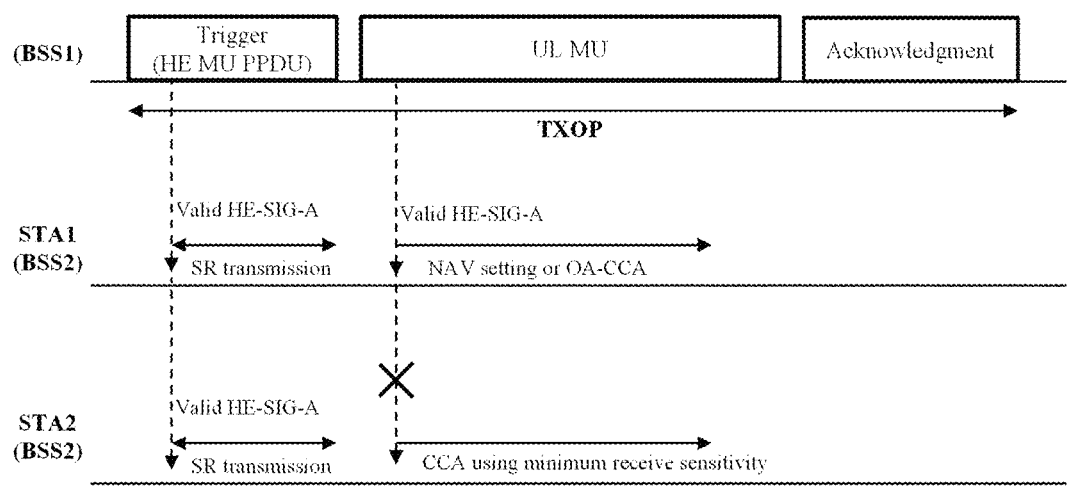
FIG. 17 shows an operation of a wireless communication terminal to set a NAV according to an embodiment of the present invention when a PPDU including a trigger frame is transmitted from the OBSS.

FIG. 17 shows an operation of a wireless communication terminal to set a NAV according to an embodiment of the present invention when a PPDU including a trigger frame is transmitted from the OBSS.

When the PPDU including the trigger frame is transmitted from the OBSS and the wireless communication terminal transmits the PPDU based on the SR operation, the wireless communication terminal may not set the NAV according to the trigger frame. Further, when the wireless communication terminal does not receive the PPDU including the trigger frame transmitted from the OBSS, the wireless communication terminal may not set the NAV according to the trigger frame.

When the wireless communication terminal receives the trigger-based PPDU transmitted from the OBSS, the PPDU may be transmitted based on the SR operation as in the above-described embodiments. At this time, when the condition that the wireless communication terminal transmits the PPDU based on the SR operation is not satisfied, the wireless communication terminal may set the NAV based on the signaling field of the trigger-based PPDU. At this time, the signaling field may be the TXOP Duration field of the HE-SIG-A field. Further, when the condition that the wireless communication terminal transmits the PPDU based on the SR operation is not satisfied, the wireless communication terminal may not perform the CCA based on the color code while the trigger-based PPDU is transmitted from the OBSS. Specifically, while the trigger-based PPDU is transmitted from the OBSS, the wireless communication terminal may use a general CCA threshold value without using the OBSS PD CCA threshold value. This is because the PPDU transmission of the wireless communication terminal may cause interference, which is larger than the interference magnitude acceptable by the wireless communication terminal receiving the trigger-based PPDU in the OBSS, to the wireless communication terminal receiving the trigger-based PPDU in the OBSS.

When the wireless communication terminal interferes with the reception of the access point of the OBSS receiving the trigger-based PPDU, a plurality of wireless communication terminals may fail the transmission to the access point of the OBSS. In addition, like the second station STA2 in the embodiment of FIG. 17, the wireless communication terminal may receive the legacy preamble of the trigger-based PPDU transmitted from the OBSS, and may not receive the non-legacy signaling field. In this case, the wireless communication terminal may perform CCA based on the minimum receive sensitivity.

In addition, when the information for determining whether the condition that the wireless communication terminal transmits the PPDU based on the SR operation is satisfied is insufficient, the wireless communication terminal may not transmit the PPDU based on the SR operation. At this time, the wireless communication terminal may not perform the CCA based on the color code while the trigger-based PPDU is transmitted from the OBSS. Specifically, while the trigger-based PPDU is transmitted from the OBSS, the wireless communication terminal may use a general CCA threshold value without using the OBSS PD CCA threshold value. At this time, when the information for determining whether to satisfy the condition for transmitting the PPDU based on the SR operation is insufficient, a case where the trigger frame is not received may be included.

In another specific embodiment, the wireless communication terminal may not perform the CCA based on the color code while the trigger-based PPDU is transmitted from the OBSS. As in the previously described embodiments, while the trigger-based PPDU is transmitted from the OBSS, the wireless communication terminal may transmit the PPDU in consideration of the reception of the trigger-based PPDU. At this time, this is because when a plurality of wireless communication terminals generate interference, the reception of the trigger-based PPDU in the OBSS may fail.

Figure 18:
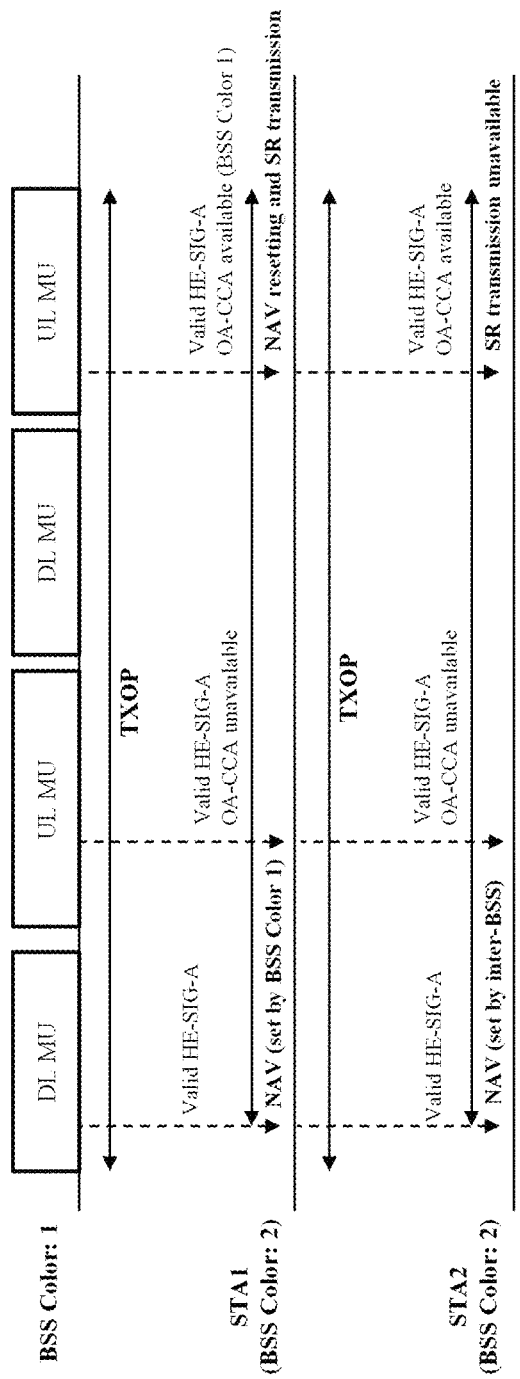
FIG. 18 shows an operation of a wireless communication terminal to set a NAV according to an embodiment of the present invention when a PPDU including a trigger frame is transmitted from the OBSS.

FIG. 18 shows an operation of a wireless communication terminal to set a NAV according to an embodiment of the present invention when a PPDU including a trigger frame is transmitted from the OBSS.

When the NAV is set and the OA-CCA condition is satisfied, the wireless communication terminal may reset the set NAV. The wireless communication terminal may reset the NAV and then transmit the PPDU according to the OA-CCA operation. Further, the wireless communication terminal may set the NAV according to the BSS indicated by the trigger-based PPDU. Specifically, when the BSS indicated by the frame for setting the NAV matches the BSS indicated by the UL PPDU of the OBSS to which the OA-CCA is applicable, the wireless communication terminal may reset the NAV.

The wireless communication terminal may determine whether the BSS is matched based on the BSS color. Specifically, by comparing the BSS color indicated by the PPDU for setting the NAV with the BSS color indicated by the UL PPDU of the OBSS to which the OA-CCA applicable, the wireless communication terminal may determine whether the BSS is matched. For this purpose, the wireless communication terminal may store the BSS color indicated by the PPDU for setting the NAV. In another specific embodiment, the wireless communication terminal may determine whether the BSS is matched based on the BSS color and the MAC address. Specifically, the wireless communication terminal may identify the BSSID of the BSS corresponding to the BSS color. At this time, the wireless communication terminal may determine whether the BSS indicated by the BSSID of the frame for setting the NAV matches the BSS indicated by the BSS color indicated by the UL PPDU of the OBSS to which the OA-CCA is applicable. In another specific embodiment, when the wireless communication terminal receives all the PPDUs continuously transmitted from one TXOP, it may be determined that the BSS indicated by the PPDU for setting the NAV and the BSS indicated by the UL PPDU of the OBSS to which the DA-CCA is applicable are the same. When the wireless communication terminal may not identify the BSS indicated by the frame for setting the NAV, even if the OA-CCA may be applied to the UL PPDU of the OBSS, the wireless communication terminal may not be allowed to cancel the NAV setting. This is because the NAV set by the frame transmitted from the BSS different from the BSS indicated by the UL PPDU of the OBSS to which the OA-CCA is applicable may be released by the OA-CCA operation.

In the embodiment of FIG. 18, the access point and the plurality of stations perform the cascading transmission sequence in the first BSS with the BSS color value of 1. At this time, the second BSS overlapping with the first BSS and having the BSS color value of 2 includes the first station STA1 and the second station STA2. The first station STA1 and the second station STA2 set the NAV based on the DL MU PPDU transmitted from the first BSS. At this time, it is assumed that the second station STA2 identifies only the inter-BSS indicated by the DL MU PPDU and does not identify the specific BSSID or BSS color indicated by the DL MU PPDU. While the first UL MU PPDU is transmitted from the second BSS, the first station STA1 and the second station STA2 determine that the OA-CCA condition is not satisfied. While the second UL MU PPDU is transmitted from the second BSS, the first station STA1 and the second station STA2 determine that the OA-CCA condition is satisfied. At this time, the first station STA1 determines that the BSS indicated by the UL MU PPDU is the same as the BSS indicated by the DL MU PPDU for setting the NAV is set, and releases the NAV. However, since the second station STA2 does not explicitly identify the BSS indicated by the DL MU PPDU for setting the NAV, the second station STA2 does not release the NAV. Therefore, the first station STA1 transmits the PPDU based on the OA-CCA operation while the second UL MU PPDU is transmitted from the second BSS. Also, the second station STA2 does not transmit the PPDU while the second UL MU PPDU is transmitted from the second BSS.

Although the embodiments described with reference to FIG. 18 are described through the cascading sequence, UL MU transmissions within one TXOP may also be applied to consecutive transmission sequences.

Figure 19:
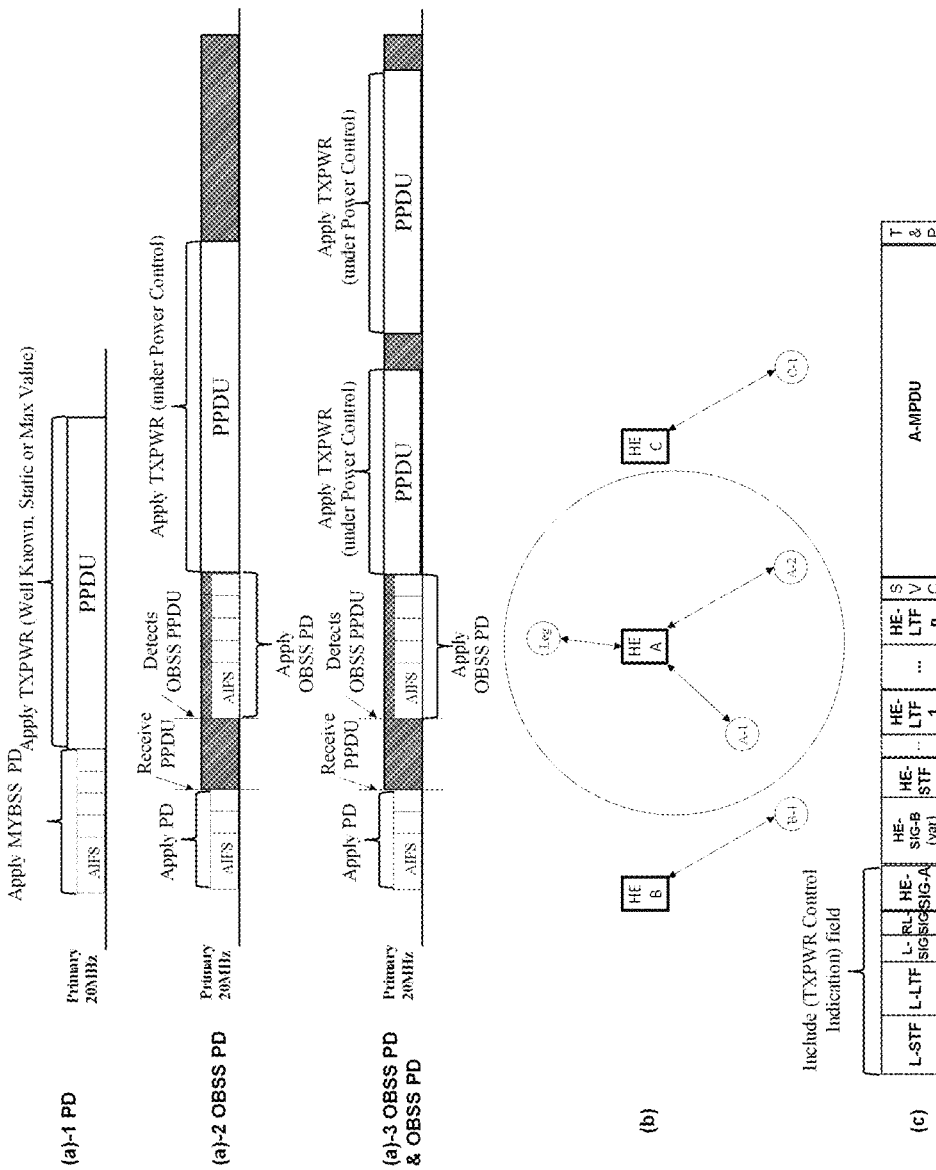
FIG. 19 shows that a wireless communication terminal according to an embodiment of the present invention transmits a PPDU by adjusting transmission power in an SR operation.

FIG. 19 shows that a wireless communication terminal according to an embodiment of the present invention transmits a PPDU by adjusting transmission power in an SR operation.

The wireless communication terminal may perform adjustment in conjunction with the OBSS CCA threshold value and the transmission power while the OBSS PPDU is transmitted. In this case, the OBSS CCA threshold value may be an OBSS PD CCA threshold value. When the transmission power of the PPDU to be transmitted by the wireless communication terminal is low, the influence of the transmission of the wireless communication terminal on the wireless communication terminal of the OBSS is relatively small. Therefore, when the transmission power of the PPDU to be transmitted by the wireless communication terminal is low, the wireless communication terminal may use a relatively high OBSS CCA threshold value. Also, as the OBSS CCA threshold value is higher, the transmission of the wireless communication terminal may more likely affect the wireless communication terminal of the OBSS. Therefore, when the OBSS CCA threshold value is relatively high, the wireless communication terminal may transmit the PPDU with a relatively low transmission power.

Specifically, when the wireless communication terminal detects the reception of the OBSS PPDU and applies the OBSS CCA threshold value, the wireless communication terminal may transmit the PPDU by adjusting the transmission power based on the OBSS CCA threshold value. In FIG. 19(a)-2, the wireless communication terminal detects PPDUs transmitted from the OBSS. The wireless communication terminal may perform the CCA by applying the OBSS PD CCA threshold value. At this time, the wireless communication terminal adjusts the transmission power of the PPDU to be transmitted based on the OBSS PD CCA threshold value. The wireless communication terminal transmits the PPDU with the adjusted transmission power.

According to the specific conditions, the wireless communication terminal may transmit the PPDU with the transmission power which is not adjusted for the SR operation while the OBSS PPDU is transmitted. At this time, the power which is not adjusted for the SR operation may be a predetermined transmission power. In yet another specific embodiment, the power which is not adjusted for SR operation may be the maximum transmission power that the wireless communication terminal may output. In addition, the predetermined transmission power may be designated by the access point.

In addition, when the wireless communication terminal does not detect the reception of the OBSS PPDU, the wireless communication terminal may transmit the PPDU with the transmission power corresponding to the MYBSS CCA threshold value. At this time, the MYBSS CCA threshold value indicates a reference value applied to the CCA of the PPDU transmitted from the BSS including the wireless communication terminal. In this case, the MYBSS CCA threshold value may be the PD CCA threshold value used in the PD. Specifically, when the received signal strength of the PPDU transmitted from the BSS including the wireless communication terminal is smaller than the CCA threshold value, the wireless communication terminal may determine that the corresponding channel is idle. Specifically, when the wireless communication terminal does not detect the reception of the OBSS PPDU, the wireless communication terminal may transmit the PPDU without adjusting the transmission power according to the MYBSS CCA threshold value. The MYBSS CCA threshold value is not a relatively high CCA threshold value like the OBSS CCA threshold value. FIG. 19(a) shows that the PPDU is transmitted at a transmission power corresponding to the MYBSS PD CCA threshold value when the wireless communication terminal fails to detect the PPDU transmitted from the OBSS. At this time, the transmission power corresponding to the MYBSS CCA threshold value may be a well known value. In addition, the transmission power corresponding to the MYBSS CCA threshold value may be a static value. Also, the transmission power corresponding to the MYBSS CCA threshold value may be the maximum transmission power that the wireless communication terminal may use.

When a PPDU transmitted through a SR operation is received, and the PPDU is transmitted in response to the PPDU received by the wireless communication terminal, when the SR operation is not considered, the corresponding PPDU transmissions may interfere with the transmission of PPDUs transmitted from the OBSS. In the embodiment of FIG. 19(b), the non-legacy access point HE A AP may perform the SR operation while the non-legacy station B-1 transmits the PPDU. At this time, the non-legacy access point HE A AP may transmit the DL MU PPDU by adjusting the transmission power. The non-legacy stations A-1 and A-2 included in the same BSS as the non-legacy access point HE A AP may transmit the UL MU PPDU based on the DL MU PPDU. At this time, when the non-legacy stations A-1 and A-2 do not adjust the transmission power to an appropriate magnitude, the transmission of the PPDU of the non-legacy stations A-1 and A-2 may interfere with the transmission of the PPDU of the non-legacy station B-1. Therefore, a wireless communication terminal that needs to receive the PPDU transmission of the non-legacy station B-1 may not receive the PPDU transmitted by the non-legacy station B-1.

Also, it may be assumed that a wireless communication terminal obtains a TXOP based on a relatively high OBSS CCA threshold value and transmits a PPDU with a relatively low transmission power corresponding to an OBSS CCA threshold value. At this time, when the wireless communication terminal transmits the PPDU with a transmission power higher than the transmission power initially used in the transmission in the same TXOP, a large interference not acceptable by the wireless communication terminal of the OBSS may occur. Therefore, within the TXOP to which the SR operation is applied, the wireless communication terminal may operate as follows.

The wireless communication terminal may transmit the PPDU by adjusting the transmission power according to the OBSS CCA threshold value in the TXOP obtained based on the OBSS CCA threshold value. At this time, the TXOP may include a cascading sequence. In addition, the TXOP may include a consecutive UL MU transmission procedure. In a specific embodiment, the wireless communication terminal may transmit the PPDU by adjusting the transmission power according to the OBSS CCA threshold value, and transmit the next PPDU by adjusting the transmission power according to the OBSS CCA threshold value in the same TXOP. Also, when a wireless communication terminal receiving a PPDU whose transmission power is adjusted transmits a response PPDU for the PPDU whose transmission power is adjusted within the same TXOP, the wireless communication terminal receiving the PPDU whose transmission power is adjusted may transmit the response PPDU by adjusting the transmission power based on the OBSS CCA threshold value. For convenience of description, a wireless communication terminal that transmits a PPDU whose transmission power is adjusted is referred to as a transmitting wireless communication terminal, and a wireless communication terminal receiving the PPDU whose transmission power is adjusted is referred to as a receiving wireless communication terminal. At this time, even if the receiving wireless communication terminal does not perform the CCA according to the OBSS CCA threshold value, the receiving wireless communication terminal may transmit the response PPDU by adjusting the transmission power based on the OBSS CCA threshold value. In addition, even if the receiving wireless communication terminal performs the CCA according to the OBSS CCA threshold value, the receiving wireless communication terminal may transmit the response PPDU by adjusting the transmission power based on the OBSS CCA threshold value. The OBSS CCA threshold value used by the receiving wireless communication terminal to adjust the transmission power may be the OBSS CCA threshold value used by the transmitting wireless communication terminal. At this time, the receiving wireless communication terminal may obtain the OBSS CCA threshold value used by the transmitting wireless communication terminal based on the signaling field of the PPDU whose transmission power is adjusted. Specifically, the receiving wireless communication terminal may obtain the transmission power of the corresponding PPDU from the signaling field of the PPDU whose transmission power is adjusted and obtain the OBSS CCA threshold value used by the transmitting wireless communication terminal based on the obtained transmission power. At this time, the signaling field may be a TCI field described below. In yet another specific embodiment, the OBSS CCA threshold value may be a predetermined OBSS CCA threshold value in the receiving wireless communication terminal.

Therefore, when the wireless communication terminal transmits the PPDU by adjusting the transmission power according to the OBSS CCA threshold value in the TXOP obtained based on the OBSS CCA threshold value, the transmission power of the PPDU transmitted within the corresponding TXOP may be adjusted according to the OBSS CCA threshold value. In FIG. 19(a)-3, the wireless communication terminal obtains the TXOP based on the OBSS PD CCA threshold value. At this time, the transmission power of the PPDU transmitted in the corresponding TXOP is adjusted based on the OBSS PD CCA threshold value.

At this time, the signaling field of the PPDU may indicate that the transmission power is adjusted. Specifically, the signaling field of the PPDU may include a TXPWR Control Indication (TCI) field indicating that the transmission power is adjusted. At this time, the TCI field may include the transmission power of the corresponding PPDU. Specifically, the signaling field of the PPDU may include at least one of L-STF, L-LTF, L-SIG, RL-SIG, and HE-SIG-A as shown in FIG. 19(c).

When the wireless communication terminal transmits the trigger-based UL MU PPDU, the wireless communication terminal may transmit the UL MU PPDU by adjusting the transmission power so that the access point may receive the UL MU PPDU. Specifically, the wireless communication terminal other than the access point may adjust the transmission power of the UL MU PPDU based on the frequency bandwidth of the frequency band allocated by the wireless communication terminal. Specifically, when the first frequency bandwidth is larger than the second frequency band, the wireless communication terminal may use a smaller transmission power when transmitting the UL MU PPDU through the second frequency bandwidth than when transmitting the UL MU PPDU through the first frequency bandwidth. This is because if the frequency bandwidth through which the wireless communication terminal transmits the PPDU is small, the wireless communication terminal may transmit it to a far distance at the same transmission power. For example, when the transmission power at which the wireless communication terminal transmits the PPDU to the access point through the frequency band having the frequency bandwidth of 20 MHz is X, if a wireless communication terminal transmits a PPDU to an access point at the transmission power X through a frequency band having a frequency bandwidth of 10 MHz, the received signal strength (RSSI) of the PPDU received by the access point may be unnecessarily high. Therefore, when a wireless communication terminal transmits a PPDU to an access point through a frequency band of 10 MHz, the PPDU may be transmitted to the access point with a transmission power less than the transmission power used when the PPDU is transmitted through a frequency band having a frequency bandwidth of 20 MHz.

Figure 20:
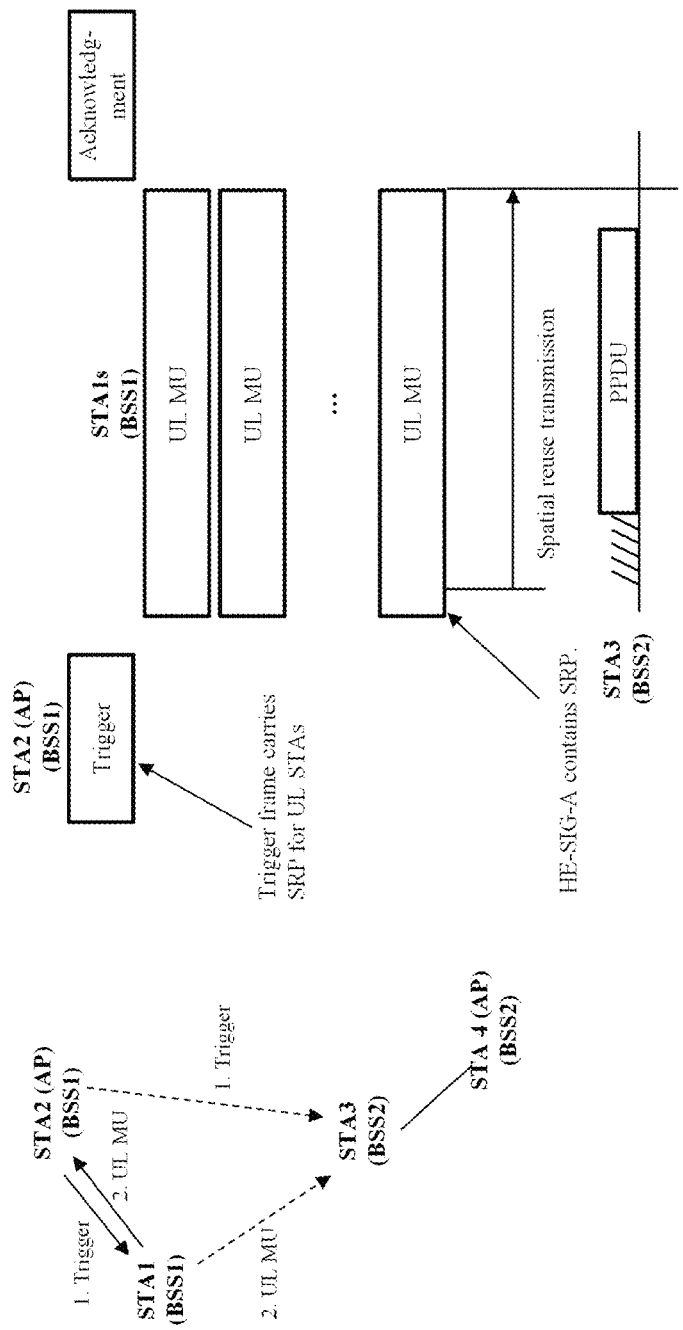
FIG. 20 shows that when a UL MU PPDU is transmitted from an OBSS, a wireless communication terminal according to an embodiment of the present invention performs an SR operation while protecting an ACK frame for an UL MU PPDU transmitted from the OBSS.

FIG. 20 shows that when a UL MU PPDU is transmitted in from OBSS, a wireless communication terminal according to an embodiment of the present invention performs an SR operation while protecting an ACK frame for an UL MU PPDU transmitted from the OBSS.

As described above, the wireless communication terminal may transmit the PPDU by adjusting the transmission power while the trigger-based PPDU of the OBSS is transmitted. That is, the wireless communication terminal may transmit the PPDU by adjusting the transmission power within the duration of the trigger-based PPDU of the OBSS. Through this, the wireless communication terminal may protect the transmission of the ACK frame for the trigger-based PPDU. At this time, when the wireless communication terminal accesses the channel based on the contention procedure and transmits the PPDU based on the SR operation, the wireless communication terminal may transmit the PPDU based on the SR operation even after the transmission of the trigger-based PPDU is completed in the OBSS. It may be regarded that the wireless communication terminal determines that the wireless communication terminal receiving the ACK frame through the contention procedure is located at a certain distance or more.

Figure 21:
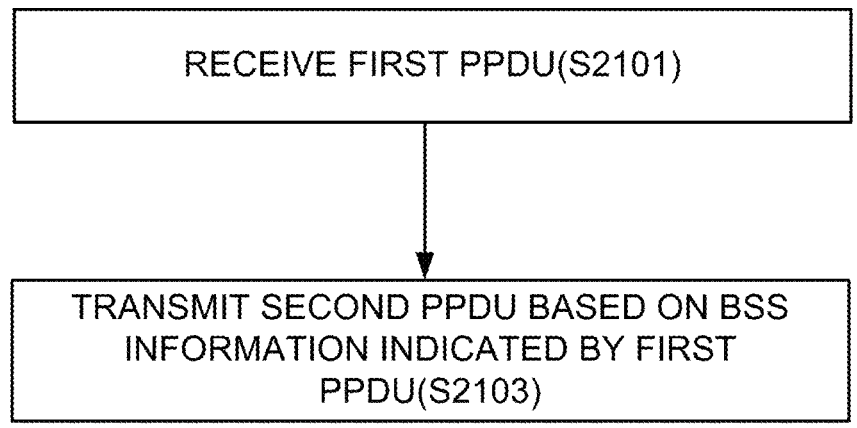
FIG. 21 shows the operation of a wireless communication terminal according to an embodiment of the present invention.

FIG. 21 shows the operation of a wireless communication terminal according to an embodiment of the present invention.

As described above, the wireless communication terminal may transmit the PPDU based on the SR operation. Specifically, the wireless communication terminal may operate as follows.

The wireless communication terminal receives the first PPDU (S2101). At this time, the wireless communication terminal transmits the second PPDU based on the BSS information indicated by the first PPDU (S2103). At this time, the BSS information may be at least one of a BSS color and a BSSID. The BSS indicated by the first PPDU may be different from the BSS including the wireless communication terminal. Specifically, the first PPDU may be a PPDU transmitted from the OBSS. Also, the first PPDU may include a trigger frame. At this time, if the wireless communication terminal measures the received signal strength of the first PPDU and transmits the second PPDU after the transmission of the first PPDU is completed, the transmission power of the second PPDU may be adjusted based on the received signal strength of the first PPDU. Specifically, the wireless communication terminal may transmit the second PPDU according to the transmission conditions described with reference to FIG. 12 and FIG. 14. Also, the wireless communication terminal may transmit the second PPDU based on the SR operation while the first PPDU is transmitted. At this time, the wireless communication terminal may change the SR operation according to the type of the first PPDU. Specifically, the wireless communication terminal may transmit the second PPDU according to the embodiment illustrated in FIG. 13.

Also, the wireless communication terminal may receive the third PPDU which is the uplink PPDU transmitted based on the trigger frame. At this time, the wireless communication terminal may decode the signaling field of the third PPDU and then transmit the second PPDU based on the signaling field of the third PPDU. Specifically, the wireless communication terminal may decode the signaling field of the third PPDU to determine whether the third PPDU is transmitted based on the second PPDU. At this time, the wireless communication terminal may adjust the transmission power of the second PPDU based on whether the third PPDU is transmitted based on the second PPDU. Specifically, the wireless communication terminal may determine whether the BSS color indicated by the signaling field of the third PPDU is equal to the BSS color of the BSS including the wireless communication terminal. At this time, based on whether the BSS color indicated by the signaling field of the third PPDU is equal to the BSS color of the BSS including the wireless communication terminal, the wireless communication terminal may determine whether the third PPDU is transmitted based on the first PPDU. Also, the signaling field may be the HE-SIG-A field described above. The specific operation of the wireless communication terminal may be the same as the embodiment described with reference to FIG. 8 through FIG. 10.

In addition, the wireless communication terminal may set a value of a network allocation vector (NAV) according to the BSS indicated by the third PPDU. Specifically, the wireless communication terminal may set a value of a network allocation vector (NAV) according to the BSS indicated by the third PPDU according to the embodiments described with reference to FIGS. 11, 17, and 18. At this time, the setting of the NAV value includes resetting the NAV.

The signaling field of the third PPDU may include a parameter determined based on the magnitude of interference acceptable by the wireless communication terminal transmitting the first PPDU when receiving the third PPDU and the transmission power of the first PPDU. At this time, the wireless communication terminal may adjust the transmission power of the second PPDU based on the parameter value and the received signal strength. At this time, the parameter value may be a normalized value over the 20 MHz frequency bandwidth. Specifically, the parameter may be the SRP described above.

Also, when the BSS indicated by the first PPDU is different from the BSS including the wireless communication terminal, the wireless communication terminal may perform CCA by applying an overlapped BSS CCA threshold value which is larger than the CCA threshold value applied to the PPDU transmitted from the BSS including the wireless communication terminal. At this time, the wireless communication terminal may determine the transmission power of the second PPDU in conjunction with the threshold value of the OBSS CCA. Specifically, when the wireless communication terminal transmits the fourth PPDU in the TXOP obtained when transmitting the second PPDU, it is possible to adjust the transmission power of the fourth PPDU in conjunction with the OBSS CCA threshold value. In addition, the wireless communication terminal receiving the second PPDU whose transmission power is adjusted may transmit the PPDU by adjusting the transmission power within the corresponding TXOP. At this time, the wireless communication terminal receiving the second PPDU whose transmission power is adjusted may determine the transmission power of the PPDU to be transmitted in conjunction with the OBSS CCA threshold value. Within the corresponding TXOP, specifically the signaling field of the second PPDU may include a field indicating that the transmission power is adjusted. Specifically, the wireless communication terminal may operate in the same manner as the embodiments described with reference to FIG. 19.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:
1. A wireless communication terminal that communicates wirelessly, the terminal comprising:
a transceiver; and
a processor,
wherein the processor is configured to:
receive a first PLCP Protocol Data Unit (PPDU) including a trigger frame through the transceiver, wherein the trigger frame triggers an uplink multiuser PPDU transmission of one or more wireless communication terminals in a first Basic Service Set (BSS) which is overlapped with a second BSS including the wireless communication terminal,
receive a physical layer header of a second PPDU which is transmitted in response to the trigger frame,
when predetermined conditions including that a transmission power of a third PPDU is below than a value which is determined based on a received signal strength of the first PPDU are met, transmit the third PPDU while the second PPDU being transmitted, and
when at least one of the predetermined conditions is not met, determine whether a channel through which the third PPDU to be transmitted is idle by using a static Clear Channel Assessment (CCA) threshold value and transmit the third PPDU according to whether the channel is idle while the second PPDU being transmitted,
wherein the static CCA threshold value is used for determining whether a channel is idle when the wireless communication terminal is receiving a PPDU transmitted from the second BSS,
wherein the physical layer header of the second PPDU comprises a spatial reuse field indicating a parameter, wherein the parameter is determined based on a magnitude of interference acceptable by a wireless communication terminal which transmits the first PPDU when receiving the second PPDU, and a transmission power of the first PPDU,
wherein the trigger frame includes the spatial reuse field, and
wherein the predetermined conditions include that the transmission power of the third PPDU is below than a value which is determined based on a received signal strength of the first PPDU and the parameter, and that the first PPDU and the second PPDU are transmitted from the same BSS.

2. The wireless communication terminal of claim 1, wherein the processor is configured to decode the physical layer header of the second PPDU to determine whether the second PPDU is transmitted from the first BSS.

3. The wireless communication terminal of claim 2, wherein the processor is configured to determine whether the second PPDU is transmitted from the first BSS based on whether a BSS color indicated by the physical layer header of the second PPDU is equal to a BSS color indicated by a physical layer header of the first PPDU.

4. The wireless communication terminal of claim 1, wherein the value of the parameter is a value normalized over a 20 MHz frequency bandwidth.

5. The wireless communication terminal of claim 1, wherein the processor is configured to not set a network allocation vector based on the trigger frame when the predetermined conditions are met.

6. The wireless communication terminal of claim 1, when the predetermined conditions are met, wherein the processor is configured to determine whether the channel through which the third PPDU to be transmitted is idle by using an overlapped BSS CCA threshold value and reduce a backoff counter by a predetermined time period when the channel is idle,
wherein the overlapped BSS CCA threshold is for a PPDU which is transmitted from a BSS overlapped with the second BSS,
wherein the backoff counter is a reference value used for channel access to the channel in an existing backoff procedure.

7. The wireless communication terminal of claim 6, wherein the static CCA threshold is higher than the overlapped BSS CCA threshold.

8. An operation method of wireless communication terminal that communicates wirelessly, the method comprising:
receiving a first PLCP Protocol Data Unit (PPDU) including a trigger frame, wherein the trigger frame triggers an uplink multiuser PPDU transmission of one or more wireless communication terminals in a first Basic Service Set (BSS) which is overlapped a second BSS including the wireless communication terminal,
receiving a physical layer header of a second PPDU which is transmitted in response to the trigger frame,
when predetermined conditions including that a transmission power of a third PPDU is below than a value which is determined based on a received signal strength of the first PPDU are met, transmitting the third PPDU while the second PPDU being transmitted, and
when at least one of the predetermined conditions is not met, determining whether a channel through which the third PPDU to be transmitted is idle by using a static Clear Channel Assessment (CCA) threshold value and transmit the third PPDU according to whether the channel is idle while the second PPDU being transmitted,
wherein the static CCA threshold value is used for determining whether a channel is idle when the wireless communication terminal is receiving a PPDU transmitted from the second BSS,
wherein the physical layer header of the second PPDU comprises a spatial reuse field indicating a parameter, wherein the parameter is determined based on a magnitude of interference acceptable by a wireless communication terminal which transmits the first PPDU when receiving the second PPDU, and a transmission power of the first PPDU,
wherein the trigger frame includes the spatial reuse field, and
wherein the predetermined conditions include that the transmission power of the third PPDU is below than a value which is determined based on a received signal strength of the first PPDU and the parameter, and that the first PPDU and the second PPDU are transmitted from the same BSS.

9. The method of claim 8,
wherein the transmitting the third PPDU when predetermined conditions are met comprises decoding the physical layer header of the second PPDU to determine whether the second PPDU is transmitted from the first BSS.

10. The method of claim 9, wherein the decoding the physical layer header of the second PPDU comprises determining whether the second PPDU is transmitted from the first BSS based on whether a BSS color indicated by the physical layer header of the second PPDU is equal to a BSS color indicated by a physical layer header of the first PPDU.

11. The method of claim 8, wherein the value of the parameter is a value normalized over a 20 MHz frequency bandwidth.

12. The method of claim 8, the method further comprises not setting a network allocation vector based on the trigger frame when the predetermined conditions are met.

13. The method of claim 8, wherein the transmitting the third PPDU when the predetermined conditions are met comprises determining whether the channel through which the third PPDU to be transmitted is idle by using an overlapped BSS CCA threshold value and reducing a backoff counter by a predetermined time period when the channel is idle,
 wherein the overlapped BSS CCA threshold is for a PPDU which is transmitted from a BSS overlapped with the second BSS,
 wherein the backoff counter is a reference value used for channel access to the channel in an existing backoff procedure.

14. The method of claim 13, wherein the static CCA threshold is higher than the overlapped BSS CCA threshold.

\* \* \* \* \*